(12) United States Patent
Moore et al.

(10) Patent No.: US 8,915,110 B1
(45) Date of Patent: Dec. 23, 2014

(54) ARCUATE SADDLES WITH ROUNDED CORNERS

(75) Inventors: Randy Lee Moore, Newton, IA (US); Jeff Rebholz, Indianapolis, IN (US); Kevin Romsey, Gilbert, IA (US); Carl Schmalzried, Ames, IA (US); Mark Wilkinson, Lake Mills, IA (US)

(73) Assignee: Buckaroos, Inc., Indianapolis, IN (US)

( * ) Notice: Subject to any disclaimer, the term of this patent is extended or adjusted under 35 U.S.C. 154(b) by 239 days.

(21) Appl. No.: 12/759,227

(22) Filed: Apr. 13, 2010

Related U.S. Application Data

(60) Provisional application No. 61/168,749, filed on Apr. 13, 2009.

(51) Int. Cl.
*B21D 28/06* (2006.01)

(52) U.S. Cl.
USPC .............. 72/131; 72/132; 72/335; 72/404

(58) Field of Classification Search
USPC .......... 72/129, 130, 324, 331, 332, 333, 335, 72/336, 337, 379.2, 375, 404, 405.01; 248/58, 62, 65, 74.1, 74.2, 74.3; 83/917, 21, 44, 45, 50
See application file for complete search history.

(56) References Cited

U.S. PATENT DOCUMENTS

| | | | |
|---|---|---|---|
| 1,079,759 A | | 11/1913 | Gray |
| 1,166,471 A | * | 1/1916 | Miner .............................. 72/332 |
| 1,413,492 A | * | 4/1922 | Rees ................................ 72/375 |
| 1,734,356 A | * | 11/1929 | Welch ............................ 428/581 |
| 1,935,848 A | * | 11/1933 | Kielberg ........................ 220/619 |
| 2,060,038 A | * | 11/1936 | Christman ........................ 413/1 |
| 2,606,517 A | * | 8/1952 | Dunlop ............................ 72/332 |
| 2,669,914 A | * | 2/1954 | Swaine .......................... 493/167 |
| 2,697,274 A | * | 12/1954 | Merrill ............................. 29/414 |
| 3,242,785 A | * | 3/1966 | Schieven et al. ................ 83/301 |
| 3,354,768 A | * | 11/1967 | Liick ............................... 83/345 |
| 3,436,946 A | * | 4/1969 | Gropp et al. .................... 72/324 |
| 3,545,248 A | * | 12/1970 | Whiteside ....................... 72/324 |
| 3,739,623 A | * | 6/1973 | Kramer ........................... 72/339 |
| 4,083,221 A | * | 4/1978 | Whitted ..................... 72/405.06 |
| 4,109,598 A | * | 8/1978 | Kucher et al. ................... 29/897 |
| 4,146,203 A | * | 3/1979 | Williams ......................... 248/62 |
| 4,317,399 A | * | 3/1982 | Romagnoli ..................... 83/237 |
| 4,344,342 A | * | 8/1982 | Garvin ............................. 83/45 |
| 4,360,959 A | * | 11/1982 | Johannesen .................... 29/417 |
| 4,570,885 A | * | 2/1986 | Heath .............................. 248/72 |
| 4,621,738 A | | 11/1986 | DeLucchi |
| 4,804,158 A | | 2/1989 | Collins et al. |

(Continued)

FOREIGN PATENT DOCUMENTS

JP 61-212423 * 9/1986 ............... B21D 5/01

OTHER PUBLICATIONS

Operating and Instructions and Parts List for Your One-Pass Roll Bending Machine, Sep. 1994.

*Primary Examiner* — Edward Tolan
(74) *Attorney, Agent, or Firm* — Woodard, Emhardt, Moriarty, McNett & Henry LLP

(57) ABSTRACT

Certain embodiments of the present invention relate to arcuate saddles typically used to anchor and suspend insulated or non-insulated pipes. Rounded corners on the saddles facilitate comfortably introducing and placing the saddles into hangers as well as improving use. Certain embodiments of the present invention involve methods of manufacturing arcuate saddles with rounded corners.

21 Claims, 22 Drawing Sheets

(56) References Cited

U.S. PATENT DOCUMENTS

| | | | |
|---|---|---|---|
| 4,984,752 A * | 1/1991 | Marrs et al. | 242/379 |
| 5,192,039 A | 3/1993 | Williams | |
| 5,568,680 A * | 10/1996 | Parker | 29/557 |
| 5,582,058 A * | 12/1996 | Knudson | 72/379.2 |
| D398,048 S | 9/1998 | Casady et al. | |
| 5,848,770 A | 12/1998 | Oliver et al. | |
| 6,224,025 B1 | 5/2001 | Alvarez | |
| 6,283,158 B1 | 9/2001 | Botsolas et al. | |
| 6,691,742 B1 | 2/2004 | Cooper | |
| 7,249,546 B1 * | 7/2007 | Fosnaugh | 83/50 |
| 7,251,902 B1 | 8/2007 | Mueller | |
| 7,284,728 B2 * | 10/2007 | Connolly | 248/62 |
| 7,503,199 B2 * | 3/2009 | Smith | 72/356 |
| 7,677,505 B2 | 3/2010 | Deichman | |
| 7,832,248 B2 * | 11/2010 | Heath | 72/379.2 |
| 8,074,943 B2 * | 12/2011 | Boudreau et al. | 248/58 |
| 8,235,331 B2 | 8/2012 | McIntosh | |
| 8,297,561 B1 | 10/2012 | Montplaisir et al. | |
| 2007/0114338 A1 | 5/2007 | Boudreau et al. | |

* cited by examiner

ARCUATE SADDLES WITH ROUNDED CORNERS

This application claims the benefit of U.S. Provisional Application Ser. No. 61/168,749, filed Apr. 13, 2009, which is hereby incorporated by reference in its entirety.

FIELD OF THE INVENTION

Aspects of the present invention relate generally to saddles for anchoring and supporting insulated and uninsulated pipes.

BACKGROUND OF THE INVENTION

Metal components which are commonly known as "saddles" are typically used in building construction to anchor and support pipes to suspend the pipes from the structure of the building. Saddles typically spread the force of a hanger across a portion of the pipe to minimize the force applied to a particular spot. Arcuate saddles with 90° right angle corners along the edges (FIG. 1) are well known in the art. An improved saddle is desired.

SUMMARY

Certain embodiments of the present invention relate to arcuate saddles typically used to anchor and suspend insulated or non-insulated pipes. Rounded corners on the saddles facilitate comfortably introducing and placing the saddles into hangers as well as improving use. Certain embodiments of the present invention involve methods of manufacturing arcuate saddles with rounded corners.

In one embodiment an arcuate saddle is formed for supporting pipe where the saddle has a length and a width. The saddle defines two parallel length sides and two parallel width sides, wherein the width is formed into an arc defined by a radius. The length sides are substantially perpendicular to the width sides and the intersections of the length sides with the width sides are formed with arcuate curves forming rounded corners.

In certain embodiments, a method for forming an arcuate saddle for supporting pipe includes forming a substantially rectangular flat saddle blank having a length and a width with two parallel length sides and two parallel width sides with corners. The length sides are substantially perpendicular to the width sides. Material is removed from the corners along a convex arcuate curve to form rounded corners tapered into the length and width sides; and the saddle blank is formed into an arcuate saddle shape defined by a radius.

In certain embodiments, a method for forming an arcuate saddle for supporting pipe includes: advancing a sheet of material; cutting convex arcuate curves into opposing edges of the material to form rounded corner portions; separating a blank with convex rounded corners defined by the rounded corner portions from the material; and forming the blank into an arcuate saddle shape. In certain options, the saddle is then ejected from the forming assembly.

In further embodiments, a progressive die assembly is provided for forming arcuate saddles for supporting pipe. The assembly include a bed defining a material path to receive a strip of sheet material advanced by a feeding mechanism. A pair of cutting pieces is aligned with the bed along opposing edges of the material path. The pair of cutting pieces is arranged in a compressive cutting relationship with the bed to cut convex arcuate curves into the material to form rounded corner portions. The bed includes a forward shearing edge. A lower stamping die with an arcuate portion is arranged along the material path forward of the forward shearing edge. An upper stamping die is arranged in a compressive relationship with the lower stamping die. The upper stamping die has a trailing shearing edge arranged adjacent the forward shearing edge of the bed to cut the material, thereby forming a separated saddle blank when the upper stamping die is compressed relative to the lower stamping die. The upper stamping die has an arcuate bending portion complimentary to the lower stamping die to stamp the saddle blank into an arcuate shape.

Objects, features and advantages of the present invention shall become apparent from the detailed drawings and descriptions provided herein.

DESCRIPTION OF PREFERRED EMBODIMENTS

For the purposes of promoting an understanding of the principles of the disclosure, reference will now be made to the embodiments illustrated and specific language will be used to describe the same. It will nevertheless be understood that no limitation of the scope is thereby intended, such alterations, modifications, and further applications of the principles of the disclosure being contemplated as would normally occur to one skilled in the relevant art.

Figure 1:
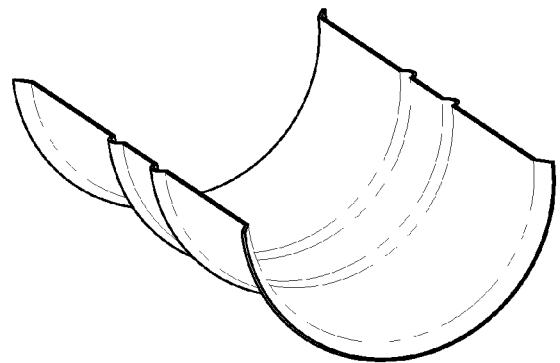
FIG. 1 is a perspective view of a prior art saddle.
Figure 2:
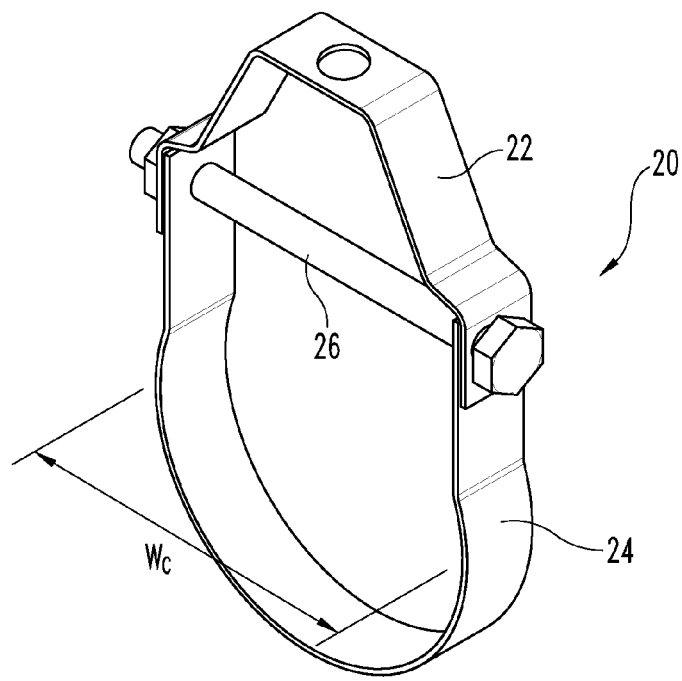
FIG. 2 is an example of a hanger assembly usable to suspend saddles according to embodiments of the present invention.
Figure 3:
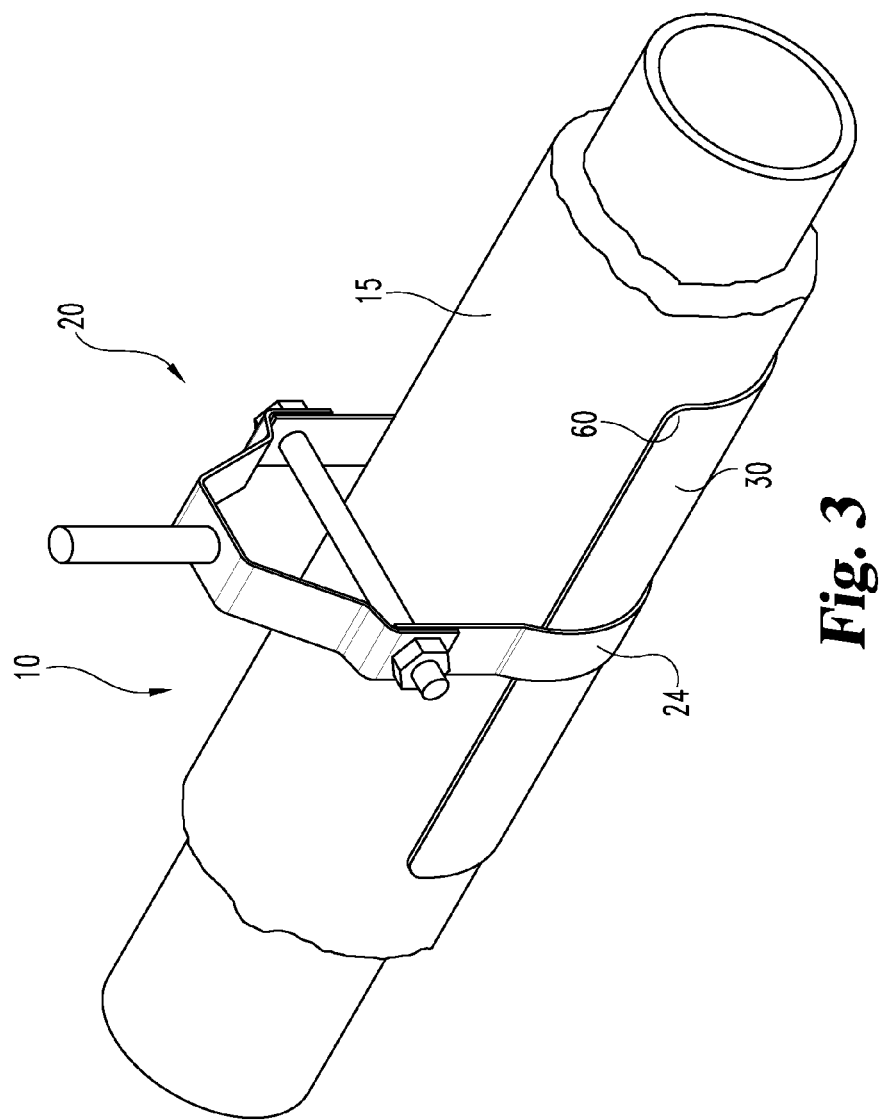
FIG. 3 illustrates a hanger assembly and saddle supporting a pipe according to a preferred embodiment of the present invention.

Embodiments of the present disclosure relate to arcuate saddles with rounded corners typically used to anchor and suspend insulated or non-insulated pipes. As illustrated in FIGS. 2 and 3, in a typical assembly 10 a hanger assembly 20 wraps around a pipe or insulated pipe 15 with a saddle 30 situated between the lower portion of the hanger and the pipe. According to an embodiment of the present invention, saddle 30 includes rounded edge corners 60, typically four, to facilitate introduction of the saddle into the hanger and to eliminate or minimize the ability of sharp corners of the saddle to catch upon or scratch a user, the hanger, a pipe, insulation, a vapor barrier or other materials during introduction or use.

Hanger 20, for example the clevis hanger illustrated in detail in FIG. 2, typically includes an upper portion or bracket 22 which can be suspended from a building structure, a lower bracket 24 for receiving and engaging the saddle and pipe and optionally includes a pivot 26 between the upper and lower brackets to allow some relative movement of the hanger portions, if necessary due to vibration, expansion or contraction. Alternately, the hanger can be one piece or a strap which suspends a pipe and saddle.

When putting together assembly 10, an installer takes saddle 30 and slides it through lower bracket 24 of hanger 20 either independently or with the introduction of pipe 15 into the hanger. The vertical sides of saddle 30 have a width in a close tolerance with the interior of hanger lower bracket 24 to transfer suspension force from the pipe to the hanger once in place.

Figure 4:
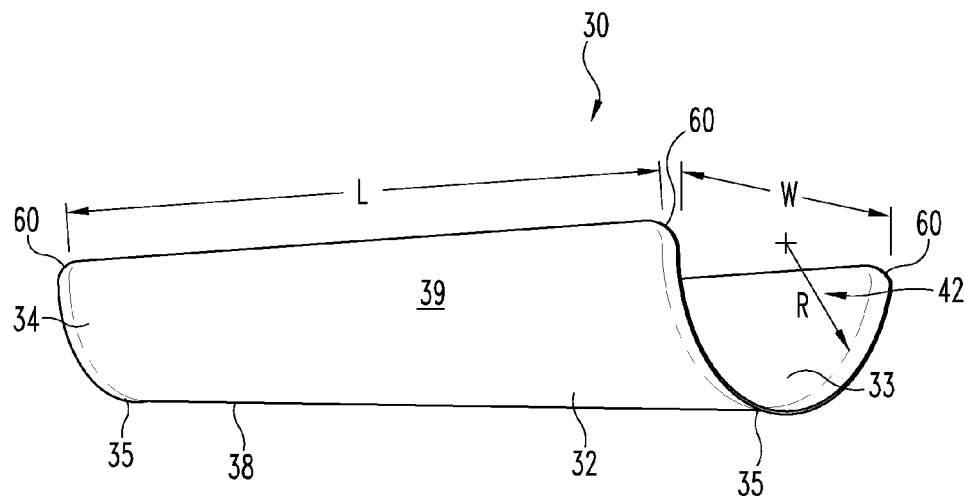
FIG. 4 is a perspective view of a saddle without ribs.
Figure 5:
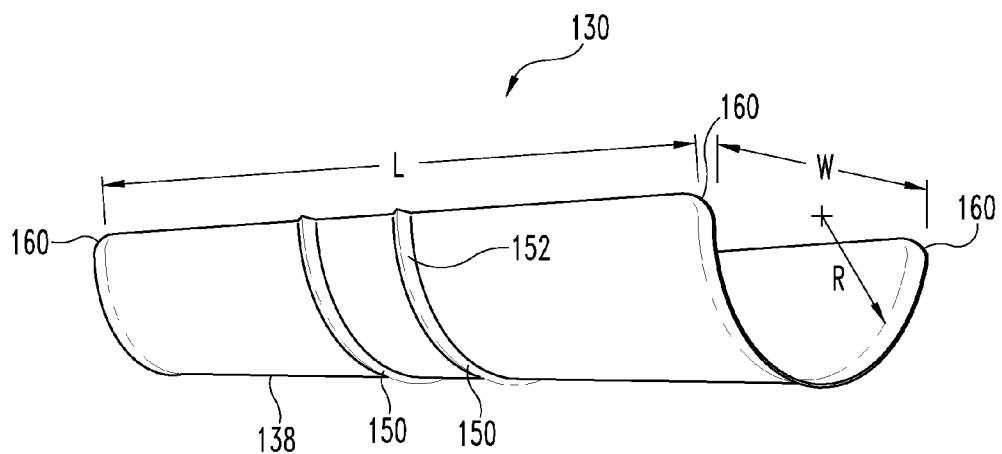
FIG. 5 is a perspective view of a saddle with 180 degree arcuate ribs.
Figure 6:
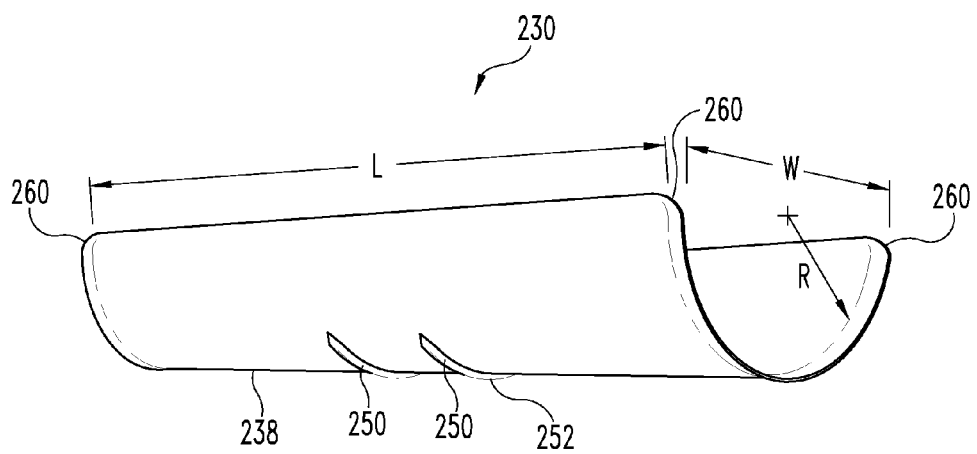
FIG. 6 is a perspective view of a saddle with partial ribs.

Certain embodiments include: non-ribbed saddles, 180° ribbed saddles or partial ribbed saddles, each with rounded corners as illustrated in FIGS. 4-6. In 180° ribbed saddles or partial ribbed saddles, the ribs or partial ribs typically have a higher profile and larger radius than the interior of the hanger particularly on the sides. When ribbed saddles are mounted in place in the hangers, the ribs preferable inhibit or minimize relative sliding movement of the saddle with respect to the hanger.

FIG. 4 illustrates a non-ribbed saddle 30 with rounded corners 60 according to one preferred embodiment. Saddle 30 is formed typically from a rectangular blank of sheet metal 32 pressed or rolled into approximately a 180° arcuate bend about a radius R, forming a length L and a width W. Saddle 30 includes two ends 33 and 34 at opposing ends of the saddle length. Ends 33 and 34 are optionally slightly outwardly flared 35 to facilitate introduction of the pipe into the saddle and to minimize any abutment of sharp edges against the pipe or insulation. The exterior face of saddle 30 includes a generally lower portion or lower face 38 and opposing vertical sides 39. "Vertical" and "lower" references herein refer to arcuate or curved portions of the saddle which may include generally vertical or horizontal tangents and are not intended to imply planar or flat portions.

The outer diameter or width W of saddle 30 is preferably sized to closely correspond to the inner diameter or width $W_C$ of the lower bracket 24 of hanger 20 while the saddle inner diameter corresponds to the outer diameter of the pipe and/or insulation. As examples, pipe and/or insulation sizes may range from 0.5 to 24 inches. More typical saddle sizes have diameters of 1.5 to 12 inches, optionally available in half-inch increments, although other diameter sizes can be made as desired. Example lengths are 8 or 12 inches.

An interior channel 42 extends through the interior of saddle 30 along a channel axis. In use, the interior diameter of channel 42 is sized to receive and engage an outer diameter of a corresponding pipe or insulated pipe.

In an option for certain embodiments, the saddle can be configured to adhere to the pipe or insulation surrounding the pipe to minimize relative movement of the saddle to the pipe or insulation. In one example of this, a double-sided adhesive strip may be mounted to the interior of the saddle longitudinally along interior channel 42. In one embodiment, the adhesive strip is pre-mounted in the saddles and includes a peel-away cover which is removed to expose an inward facing adhesive face just prior to installation. In an alternate embodiment, an unmounted two-sided strip with two peel-away covers may be supplied with the saddle. In the two-sided version, a first face is first exposed and mounted either to the pipe assembly or the saddle. The second face is then exposed and adhered to the other of the saddle or pipe assembly when they are arranged respectively in a desired location. One or more adhesive strips may extend all or partially along the length of the saddle, and can be mounted between the interior lower portion of the saddle and a pipe assembly or along one or both side portions.

In the embodiments of FIGS. 5 and 6, 180° ribs 150 or partial ribs 250 are defined on the lower face 138 and 238 of saddles 130 and 230 with rounded corners 160 or 260. Ribs 150 and 250 typically have an arcuate bend corresponding in shape to the arcuate curve of lower face 138 and 238. The ribs are generally transverse to the length L of saddle 30 and parallel to the width W. Ribs 150 and 250 preferably extend a sufficient height and width to inhibit saddle 130 or 230 from moving relative to the lower bracket 24 of hanger 20 once installed. When partial ribs are used, the partial ribs 250 are preferably primarily oriented on lower face 238 and do not substantially extend to side portions. In certain preferred embodiments, the arcuate bend of the partial ribs 250 is approximately 60° or less.

Ribs 150 and 250 each include a central peak section 152 or 252 and opposing slanted or curved sides extending from face 138 or 238 to peak 152 or 252. Peak section 152 or 252 may be sharp, blunted or rounded. The ends of the partial ribs 250 may be sharply defined, but preferably are tapered into saddle 230 at each end to form a closed end. Ribs 150 or 250 could be mounted to lower face 38 with an attachment process, but preferably are formed into the metal.

In certain preferred embodiments of the present invention, arcuate saddles are made with rounded corners. Non-limiting examples of corner radii which may be used are ¼", ⅜" or ½". Alternately a larger or smaller radius of curvature, or a non-constant radius may be used as desired. Preferably the rounded periphery at each corner is convex and smoothly tapers into the respective length and width edges of the saddle to eliminate sharp corners or discontinuities.

In one method of manufacture, rounded corners 60, 160 or 260 are individually formed into a piece or "blank" of sheet metal either to be bent or in an already arcuately formed saddle. A blank is typically a flat, rectangular sheet of metal with a length corresponding to the desired length of the saddle and a width corresponding to the desired circumference of the saddle around the desired radius. The length forms two parallel length sides which are perpendicular to two parallel width sides. The corners of the blank or saddle may be individually formed by cutting or grinding. Examples of ways to cut or trim the corners include automated or manual trimmers or using a grinding machine to shape the blank or saddle to remove material and to form the rounded portion.

If the corners are cut or trimmed into a flat sheet metal blank, the blank may then be bent into an arcuate shape, for example using a stamping or rolling process. One method of roll bending saddles is to use a two or three roll bending machine, for example, using an Acrotech Model 1618 two roll bending machine. The roll bending machine may form a flat or ribbed blank into a non-ribbed saddle, a 180° ribbed saddle or a partially ribbed saddle, as desired, and may form flares on the edges as desired.

Alternate methods of manufacturing include forming the corners with an automated process, such as in a stamping machine which forms the corners by trimming a blank either simultaneously or as a separate step to forming the blank into an arcuate shape. A typical stamping machine compresses the blank between mating portions for bending and/or cutting.

In certain embodiments one or more stamping machines may be used with successive stamping steps and positions. In one embodiment, a first stamping position includes substantially flat male and female portions forming a cutting table to support a flat blank piece. Cutting punches extend from the male and/or female portions corresponding to each desired rounded corner. During compression, pressure is preferably applied so that the cutting punches penetrate and cut through the blank to remove material from the blank, forming rounded corners. Upon opening of the stamping machine, a substantially flat blank with rounded corners may be removed.

The flat blank with rounded corners is then automatically fed or manually transferred to a second stamping position of the same or a different stamping machine. In the second stamping position, the blank is arranged between a protruding male portion and receiving female portion formed in complementary arcuate shapes. When the stamping machine is compressed, the portions bend the blank into an arcuate saddle shape. Optionally, the stamping machine portions may also include protruding 180 degree or partial ribs which stamp corresponding rib sections into the saddle during the same step.

Figure 7:
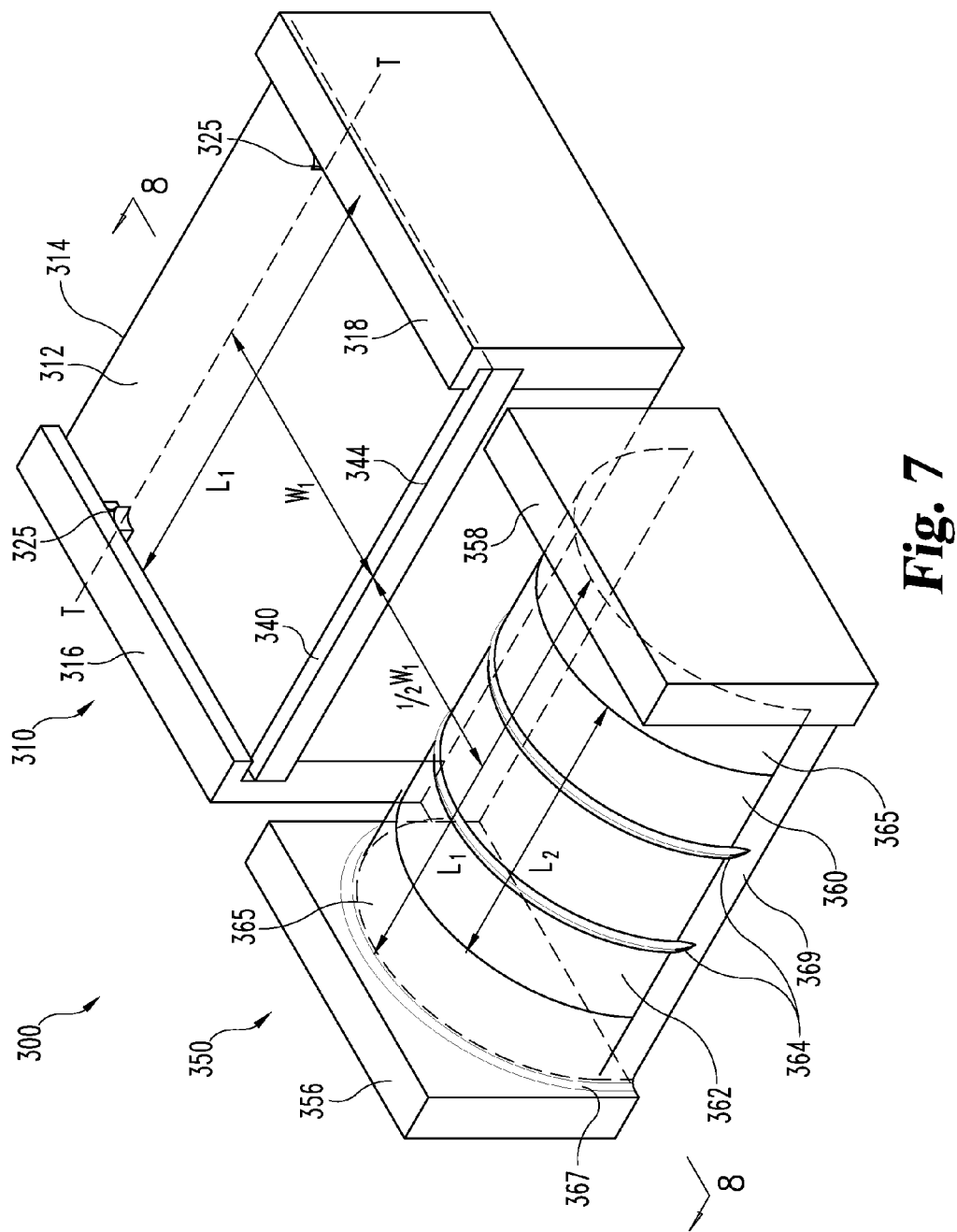
FIG. 7 is a perspective view of the lower portion of a progressive die arrangement for stamping arcuate saddles according to certain embodiments of the present invention.
Figure 8:
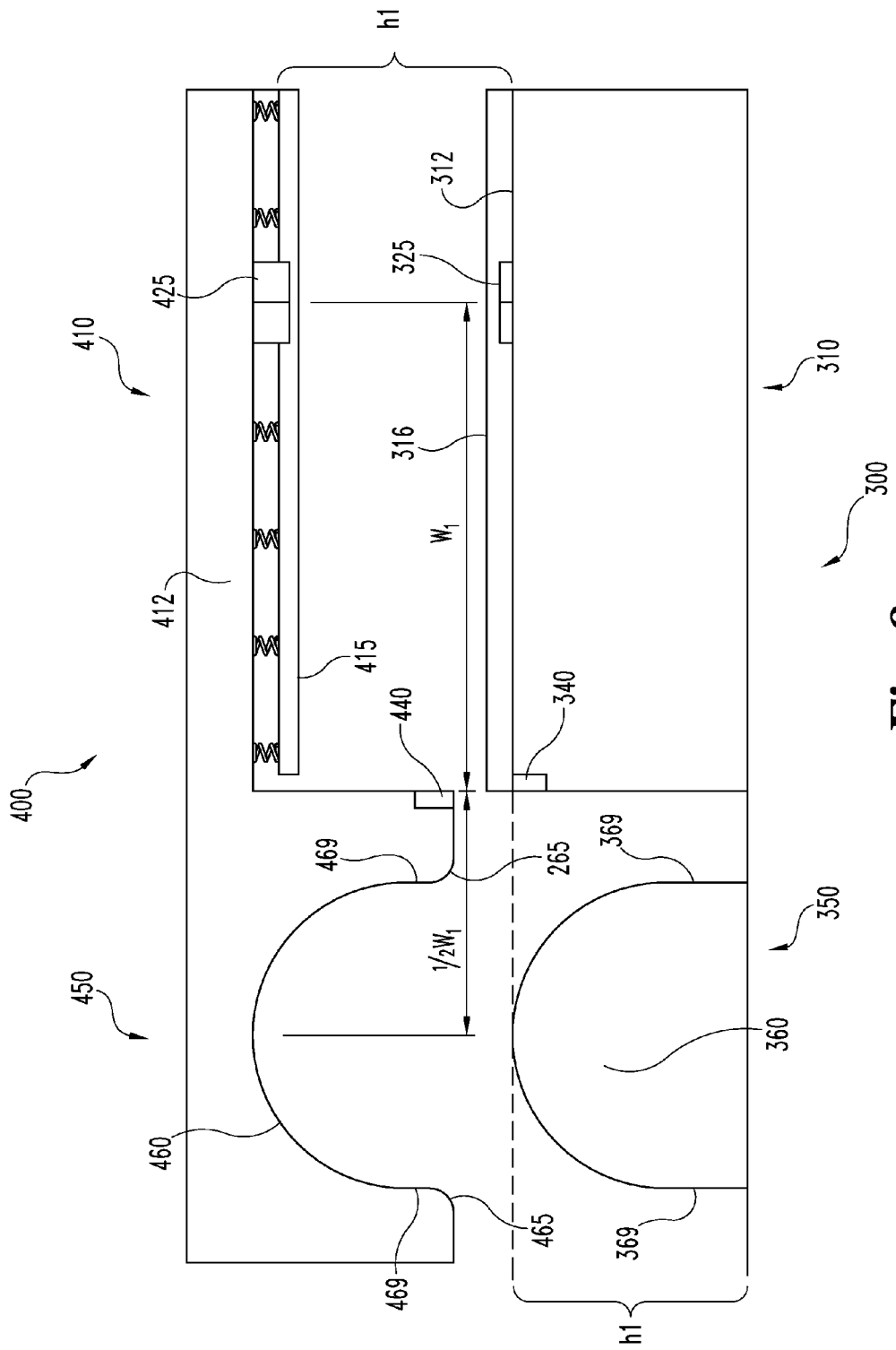
FIG. 8 is a cross-sectional view of the upper and lower portions of the progressive die arrangement of FIG. 7.

An example embodiment of a stamping machine and process is illustrated in FIGS. 7 and 8. FIGS. 7 and 8 show an example of a progressive die having a lower die portion 300 and an upper die portion 400. Lower die portion 300 includes a cutting portion 310 and a bending portion 350. Upper die 400 includes a corresponding cutting portion 410 and bending portion 450.

As illustrated in detail in FIG. 7, cutting portion 310 of lower die 300 includes a bed portion 312 with an entry edge 314, an upper edge 316 and a lower edge 318. An exit edge 344 of the bed is formed with a replaceable cutting bar 340 mounted along the edge opposite entry edge 314.

Cutting pieces or punches 325 are mounted in bed 312. Cutting pieces 325 are preferably formed with two concave radius portions extending from each side of the cutting piece inward toward the center of the bed to an inner tip. The tips of the two cutting pieces are preferably aligned along a trim axis T-T. Optionally, cutting pieces 325 are selectively mountable in various locations relative to bed 312 to vary the width distance $W_1$ between axis T-T and the cutting edge 344 of bar 340 in certain preselected measurements. Optionally, cutting pieces 325 may also be mounted to bed 312 along the upper and lower edges forming side rails 316 and 318 as shown, or each may be moved inward along the length axis $L_1$ of bed 312 to engage a correspondingly shorter length of material. The length of dimension $L_1$ is intended to correspond to the desired length of the finished saddle piece, for example saddle lengths of 8 or 12 inches. The length dimension $L_1$ may correspond to the width measurement from the perspective of a metal strip or ribbon being supplied to die portion 300, such as from a steel coil.

In correspondence with cutting portion 310 of lower die 300, cutting portion 410 of upper die 400 is arranged with a cutting bed portion arranged to mate with lower bed 312. Cutting or pierce punch pieces 425 which are complimentary in shape to cutting pieces 325 are mounted to upper portion 412. As shown, cutting pieces 425 include two convex radius portions extending from outer edges inward towards the center of the bed to meet at a tip. Cutting portions 325 and 425 are preferably substantially equal in complimentary shapes with a slight tolerance difference in size so that upon compression of the die, a lower cutting portion 325 pushes upward on a piece of metal in the die a while upper cutting portion 425 pushes downward on the metal creating a shearing effect to cut a plug of material from the metal, leaving a shape in the metal matching the radius portions where the upper and lower cutting punches pass.

In an optional feature, upper bed 412 may include a compression plate 415 mounted on springs. When used, the compression plate typically would be the first portion of the upper cutting portion 412 to contact the metal material in the die and would provide a clamping force on the metal between the plate and lower bed 312 to hold the metal in place while the upper die continues its downward stroke. As the downward stroke continues, the springs compress to resiliently increase the clamping pressure on the metal in the die until the cutting portions have finished a cutting downward stroke. The clamping pressure releases and retracts as the upper die 400 moves in the reverse stroke.

Lower die 300 further includes bending portion 350 arranged to receive material exiting cutting portion 310. Bending portion 350 includes a radiused male portion 360 forming a radius and diameter corresponding to the desired inner arcuate radius and curve of the saddle. The radius may extend for approximately 180°, or optionally may include a slight variation or be slightly oversized to accommodate expected spring back of the metal material being bent.

Male radius 360 typically includes a radiused face portion 362 forming a central portion of the bending surface. Optionally arranged on opposing sides of the center of central portion 362 are partial or full ribs 364 to press corresponding partial or 180° ribs into the metal blank being bent. The face of radius 360 preferably includes slightly tapered flared portions 367 at each end to impart a flare to the upper and lower edges of the blank being bent.

In certain embodiments, the face of radius 360 includes radiused sections 365 arranged outward along the length $L_1$ between upper edge 356 and lower edge 358 of bending portion 350.

Optionally, the face of bending portion 350 can be arranged to accommodate a narrower blank corresponding to an arrangement where cutting portions 325 are spaced inward from upper edge 316 and lower edge 318 of bed 312. For example, this can be used with a strip of metal having a length $L_2$ such as eight inches. In this arrangement, spacer plates (not shown) are placed over the outward radiused sections 365 so that a centered metal blank is fed between them in the area designated $L_2$. The spacer plates optionally include flared portions along their central edges so that a blank bent in the $L_2$ region receives flared outer edges. The spacer plates preferably include radii to correspondingly fit snugly on radiused portions 365 when in place without interfering with compression of the die. The spacer plates may be mounted by resting in place or may optionally be secured with fasteners.

Upper die 400 has an upper bending portion 450 matching and complementary to lower bending portion 350. As illustrated in a cross-section in FIG. 8, bending portion 450 includes a cutting bar 440, preferably replaceable, which forms a shearing relationship with lower cutting bar 340 to cut material in the die as the die compresses.

Bending portion 450 includes a concave female radius 460 complementary to male radius 360. Female radius 460 may optionally include indentations or grooves allowing for partial or full ribs 364 to press ribs into the metal being bent. In some embodiments, male radius 360 and female radius 460 each include slight vertical wall sections 369 and 469 transitioned from the arcuate radius portions to allow the male and female portions to compress sufficiently to impart a full 180° radius to the metal being bent. Preferably, the center of male bending portion 350 is spaced from the shear or cutting edge 344 of cutting bar 340 at a distance of ½ $W_1$. The spacing corresponds to half of the distance $W_1$ between the punch 325 cutting tips along trim axis T-T and the shear edge 344.

In operation of the illustrated progressive die, a ribbon or strip of metal is fed into bed portion 312 from the direction of intro edge 314. The strip or ribbon of metal may have a width corresponding to the desired length of the saddle to be made, for example filling length distance $L_1$ of bed 312. The thickness of the metal is preferably of a gauge designed to be cut by the height of punch pieces 325 and 425. Prior to the introduction of the metal, cutting punches 325 and 425 are arranged at a distance $W_1$ from shearing edge 344 of cutting bar 340 where distance $W_1$ corresponds to the desired blank to be cut with a width to be formed into the desired circumference measurement of the saddle piece to be produced.

In a loading step, the leading edge of the metal with two rounded corners is advanced into bed 312 until the forward edge is adjacent the shear edge of cutting bar 340. Optionally, the metal may be advanced further or less; however, a scrap portion will need to be cut and discarded in the first cycle or two of the die to create a leading edge with two rounded corners.

In a first cycle of operation, the male and female die portions compress to shear off any excess material extending beyond cutting bar 340 and also to punch radiused convex indentations along axis T-T into the metal material. Upon completion of the first compression and release cycle, the metal strip is advanced a distance $W_1$ through the die. In the next position, the portion of the metal in which the radiused indentations were made along axis T-T is aligned with the shearing edge of cutting bar 340 with the forward portion of the metal extending between the bending portions of the respective dies. Upon the next compression cycle, cutting bars 340 and 440 shear the material along axis T-T leaving a blank to be bent in the bending portions of the dies while also punching the next radiused indentations with punches 325 and 425 into the metal of material. Each compression and cutting cycle by punches 325 and 425 forms two rounded corners on one side of axis T-T and two rounded corners on the opposite side of axis T-T. When the metal is cut along axis T-T, these form rounded trailing corners of a prior blank and rounded leading corners on the edge of the next blank.

As the die closes in the second and successive iterations, the upper point of male radius 360 and the lower portions of upper bending portion 450 contact and hold the metal piece between them in a three point contact grasp. As the metal is cut and the dies continue to compress, the metal is bent around male radius 360 until the desired bend arc has been imparted to the blank. Typically the cutting portions and bending portions simultaneously compress and retract the same distance $h_1$ during a cycle.

During compression bending, the outer portions of the blank are pushed downward and slightly drawn inward to wrap around the male radius 360. The lower edges of the female radius 460 preferably include a slight radius or taper 465 to facilitate the metal being bent rather than scraped as the female radius is forced downward to wrap the metal.

Upon completion of the compression cycle, the die portions are separated and the formed arcuate saddle may be removed from lower bending portion 350. The metal strip or ribbon is then advanced a distance $W_1$ to provide the next portion of material to be cut off and bent in the bending portions and the next portion of material to be cut with indentations in the cutting portions of the die. The operation may then be repeated as desired to form multiple arcuate saddles with rounded corners.

In certain optional embodiments, the female bending portion 450 may include one or more retractable compression pins to contact the metal blank during the compression portion of the cycle. The pin or pins preferably push the saddle out to prevent it from sticking within the female bending portion during the upward stroke.

In certain optional embodiments, an embossing die may be arranged in the cutting or bending portions of the arrangement to emboss indicia such as size information or a brand name or logo into the inner or outer faces of the saddle being formed.

In one embodiment, the cutting portions and bending portions are mounted in a fixed distance relationship defined so that the distance between shear edge 344 and the center of bending portion 350 is one-half of the distance between the shearing edge 344 and the trim axis T-T. Alternately, the distance between the cutting portions and the bending portions can be varied at predefined intervals to maintain the relationship of $W_1$ to ½ $W_1$ as the cutting punches 325 are arranged within bed 312 to accommodate different width measurements $W_1$. For example, different width measurements $W_1$, would be used to accommodate the differences in circumference measurements between arcuate saddles of differing radii and diameters. In an alternate embodiment, the bending portion can be arranged to receive a cut blank with rounded portions from the cutting portions and to then automatically center the blank over the desired radius portion.

A further example embodiment of a stamping machine 500 and process is illustrated in FIGS. 9 through 22. FIGS. 9-22 show an example of a progressive die arrangement having a cutting assembly 510, a bending assembly 550 and an ejector assembly 590.

Figure 9:
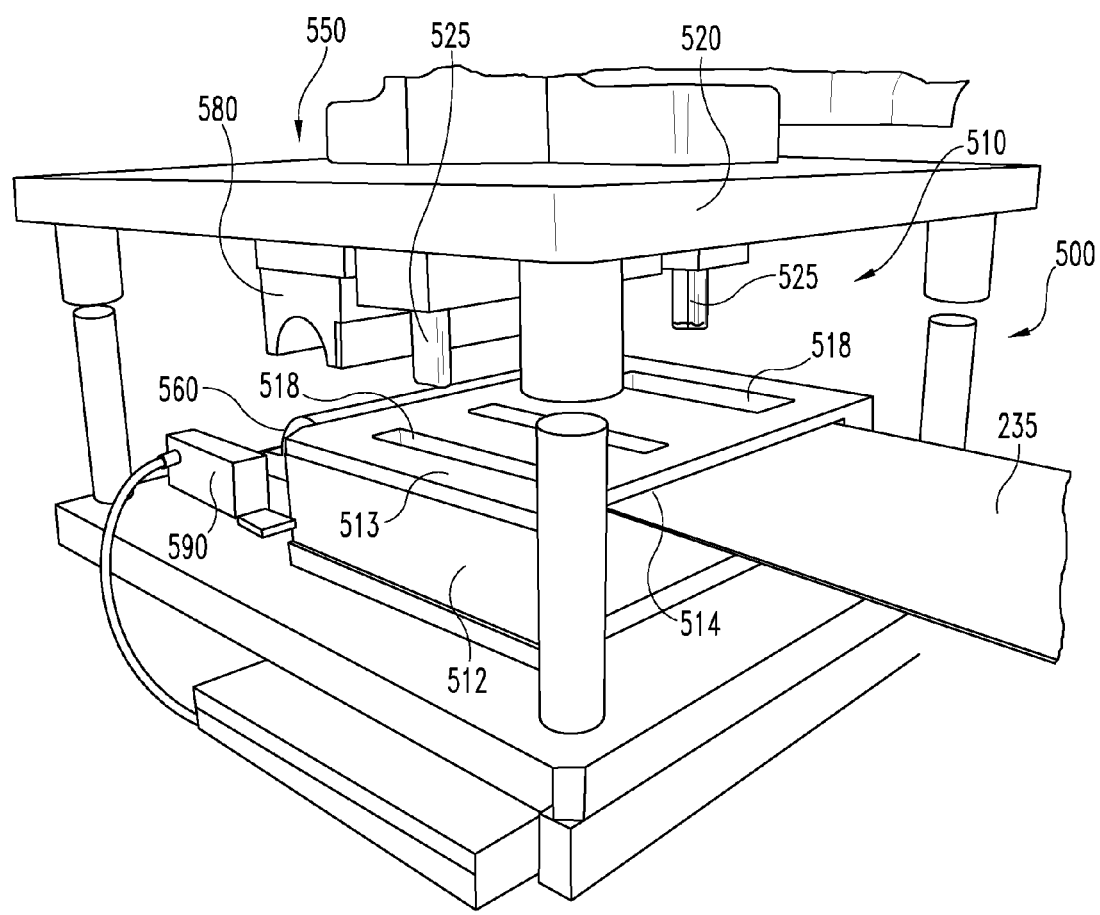
FIGS. 9-11 are perspective views of one embodiment of a progressive die arrangement according to certain embodiments.
Figure 10:
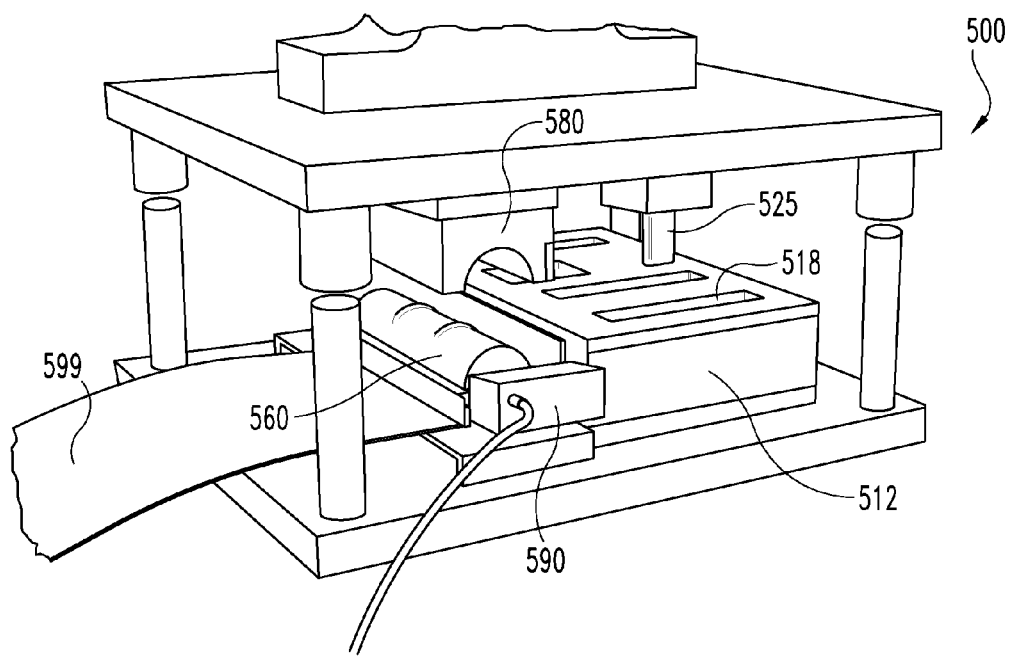
Figure 11:
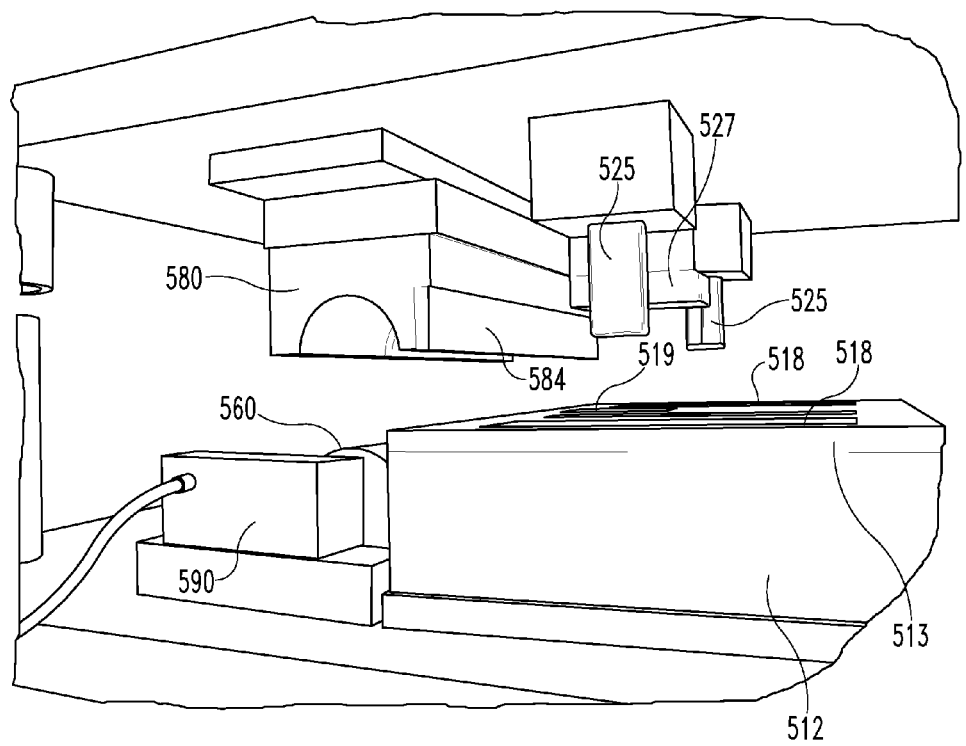
Figure 13:
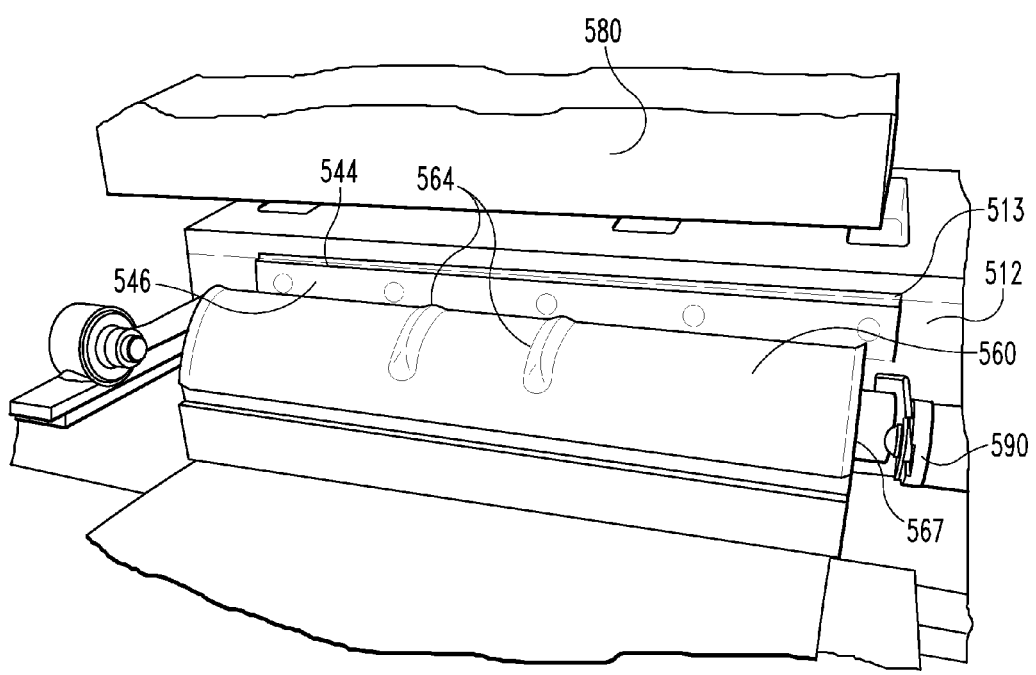
FIGS. 13-15 are perspective views of the bending assembly of FIGS. 9-11.

As illustrated in detail in FIGS. 9-11, cutting assembly 510 includes a lower portion with bed 512. The top of bed 512 is closed with an upper plate 513. Bed 512 includes a bed area with side rails which is covered by plate 513 to define a sheet metal path with entrance 514 sized to receive sheet metal material 235 fed, for example from a coil and advanced by a feeding mechanism. The bed ends in forward or shearing edge 544 (FIG. 13). Upper plate 513 defines vertical edge slots 518 arranged along its longitudinal length and optionally a logo stamping slot 519.

Figure 12A:
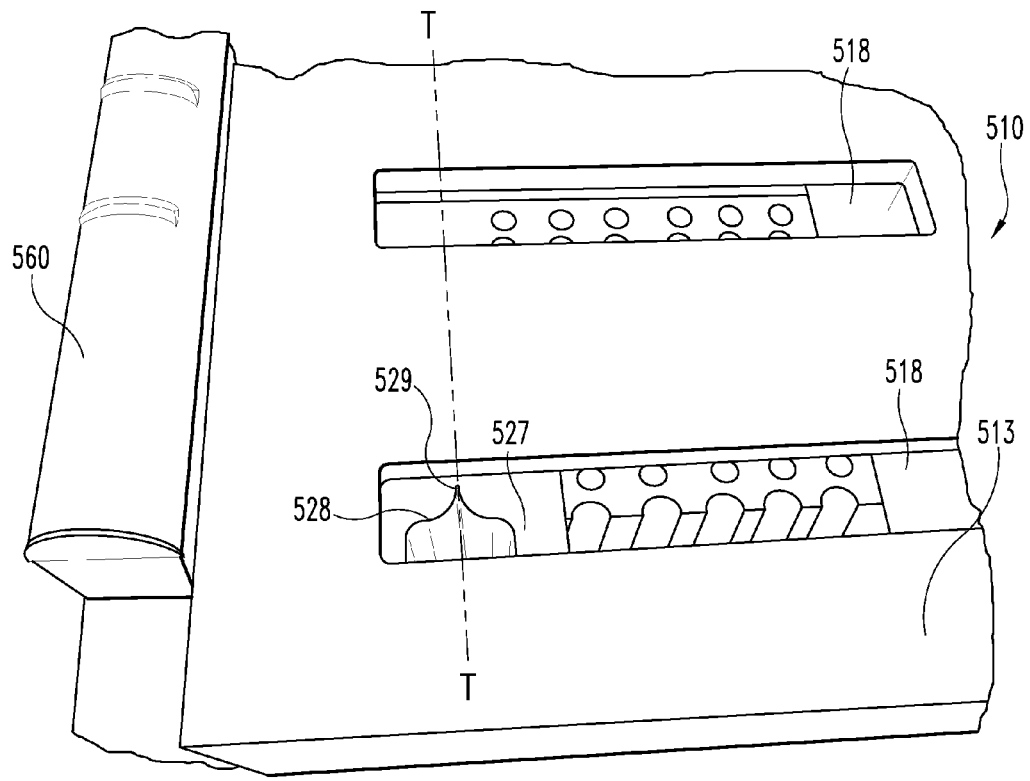
FIGS. 12A and 12B are perspective views of the lower and upper cutting pieces and profiles usable in the embodiments of FIGS. 9-11.

Bed 512 includes two cutting profiles 527, as seen in FIG. 12A, aligned with edge slots 518, which are complimentary in shape to and are mated to form a shearing arrangement with the cutting profiles of cutting pieces 525. In the illustrated embodiment, the cutting profiles 527 within bed 512 have two convex radiused portions 528 extending from each side inward toward the center of the bed to a tip 529. The tips of the two cutting profiles are preferably aligned along a trim axis T-T.

Figure 12B:
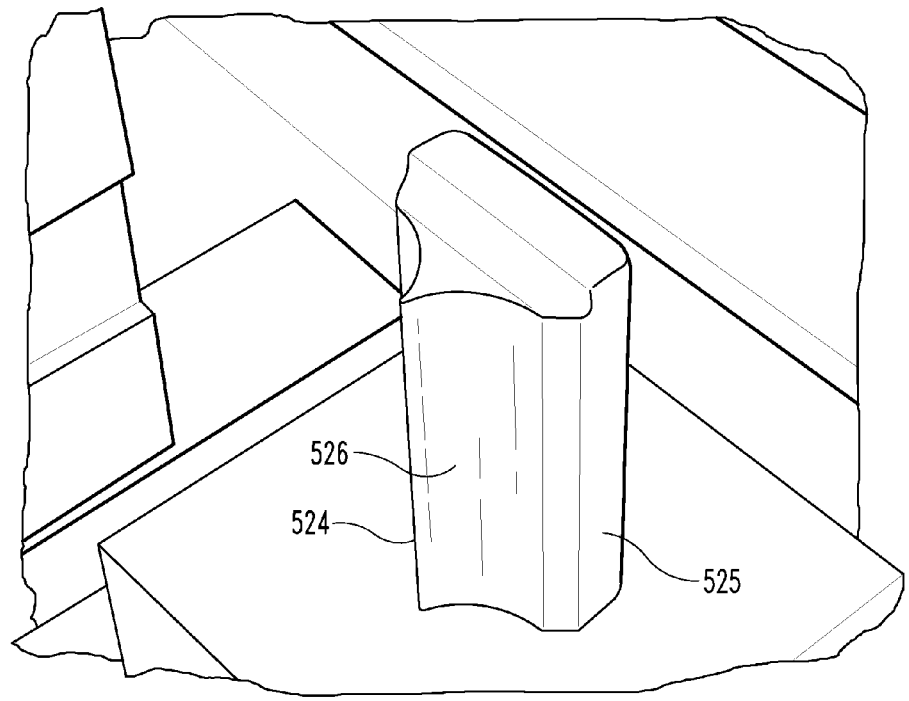

The upper portion of cutting assembly 510 includes an upper carrying plate 520 with cutting pieces or pierce punches 525 extending downward. As seen in FIG. 12B, cutting pieces 525 are preferably formed with a cutting profile having two concave radiused portions 526 extending from each side of the cutting piece inward toward the center of the bed to a tip 524.

Figure 16:
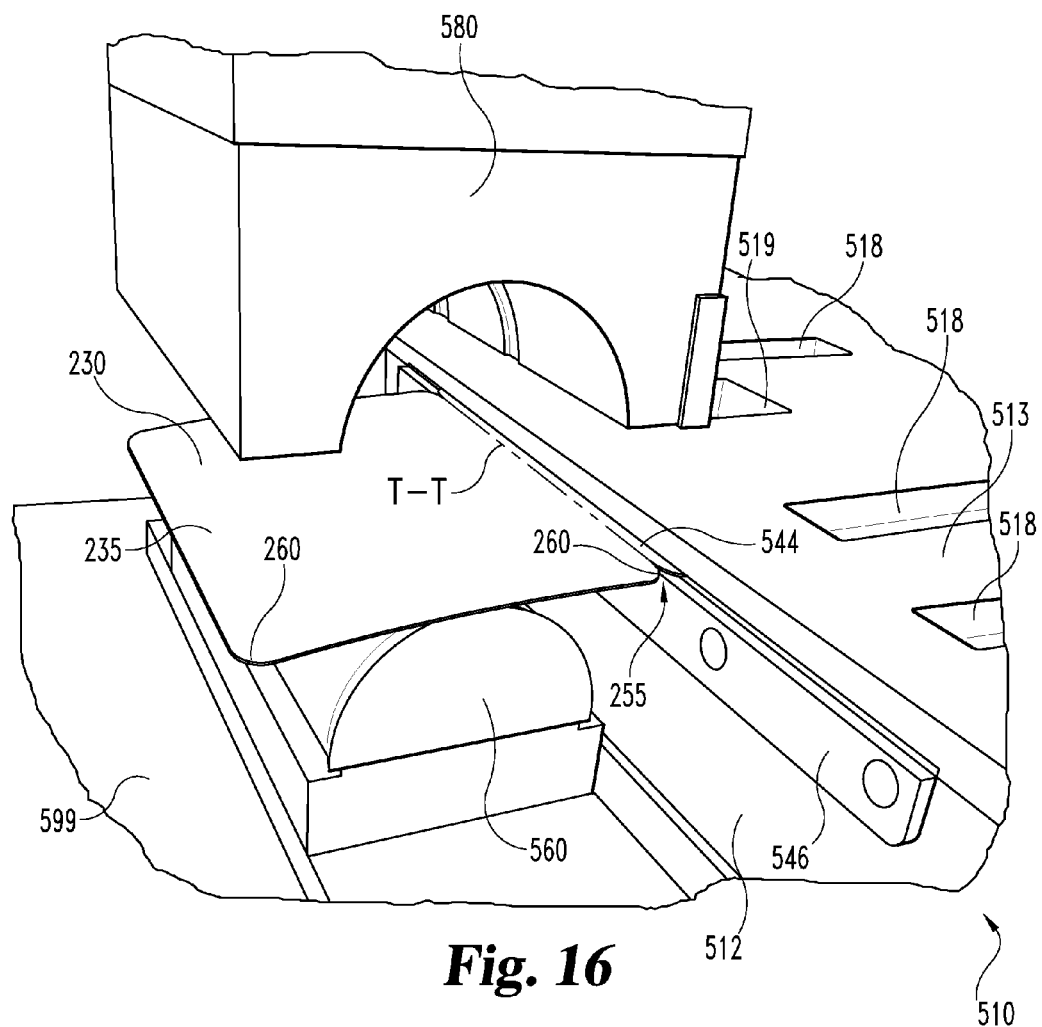
FIGS. 16-19 illustrate operative steps of the arrangement of FIGS. 9-11.

Cutting pieces 525 of the upper portion are aligned with longitudinal edge slots 518 in plate 513 and with the cutting profiles 527 of bed 512. Cutting pieces 525 and cutting profiles 527 are preferably substantially equal in complimentary shapes with a slight tolerance difference in size so that upon compression of the die, the upper cutting portions push downward on the sheet metal, while the lower cutting profiles resist/push upward, creating a shearing effect to cut a plug of material from the metal, leaving a cutout shape 255 (FIG. 16)

in the metal 235 matching the radius portions where the cutting pieces and the cutting profiles pass.

Cutting pieces 525 and cutting profiles 527 are preferably selectively mountable in various locations along the length of edge slots 518 to vary the distance between axis T-T and the forward or cutting edge 544 of bed 512. They optionally may also be mountable along the width of bed 512. For example, two edge slots 518 are illustrated along one side of plate 513. The cutting pieces on that side can be arranged in the inner or outer edge slots to accommodate metal widths corresponding to different lengths for example lengths $L_1$ and $L_2$ as discussed with respect to FIG. 7.

If desired, an optional logo stamping piece 520 may be aligned with an optional logo stamping slot 519. The logo stamping piece may be used to stamp the imprint of graphics or text into the sheet metal to apply a logo, sizing indicia or other information as desired.

Figure 14:
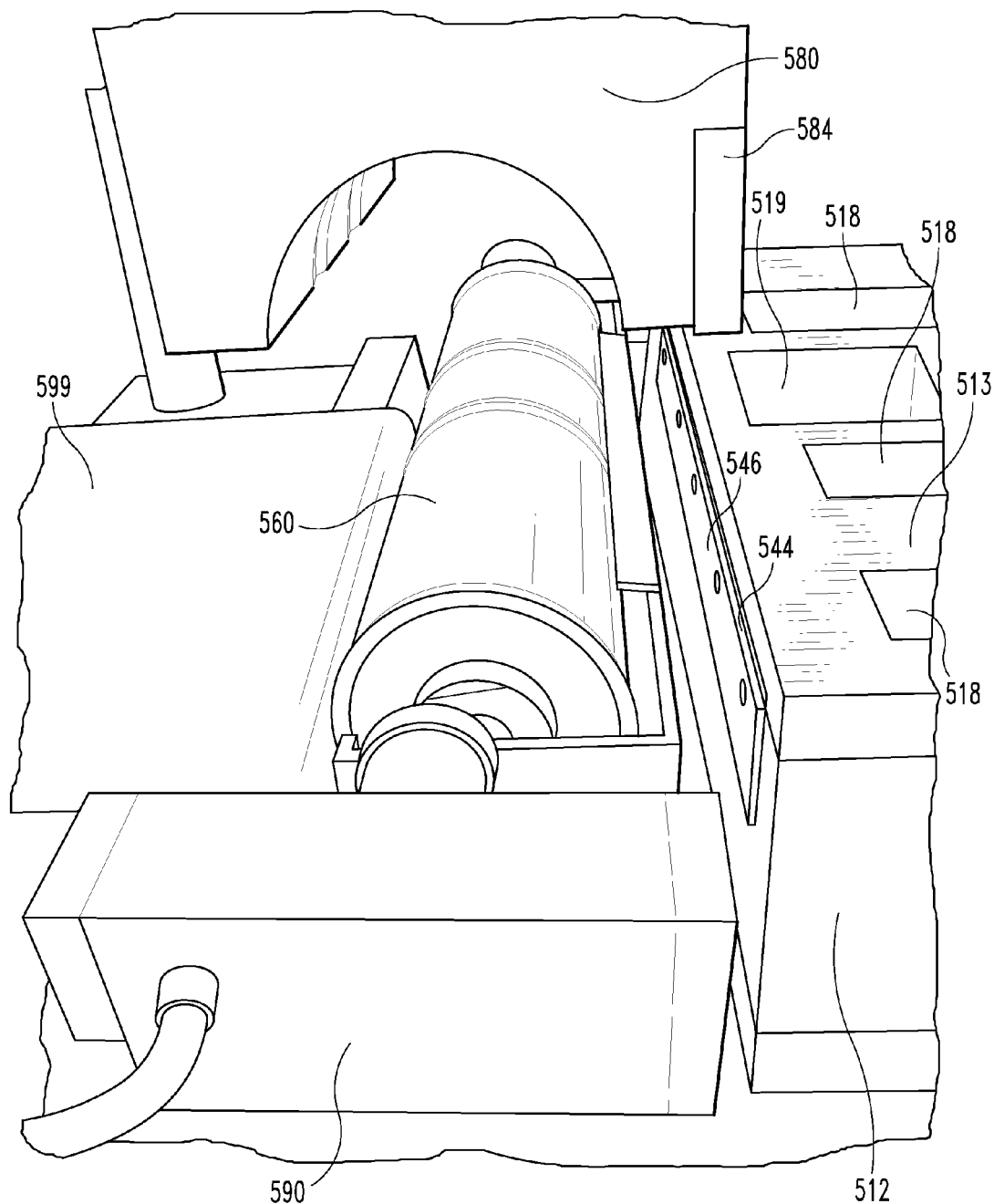
Figure 15:
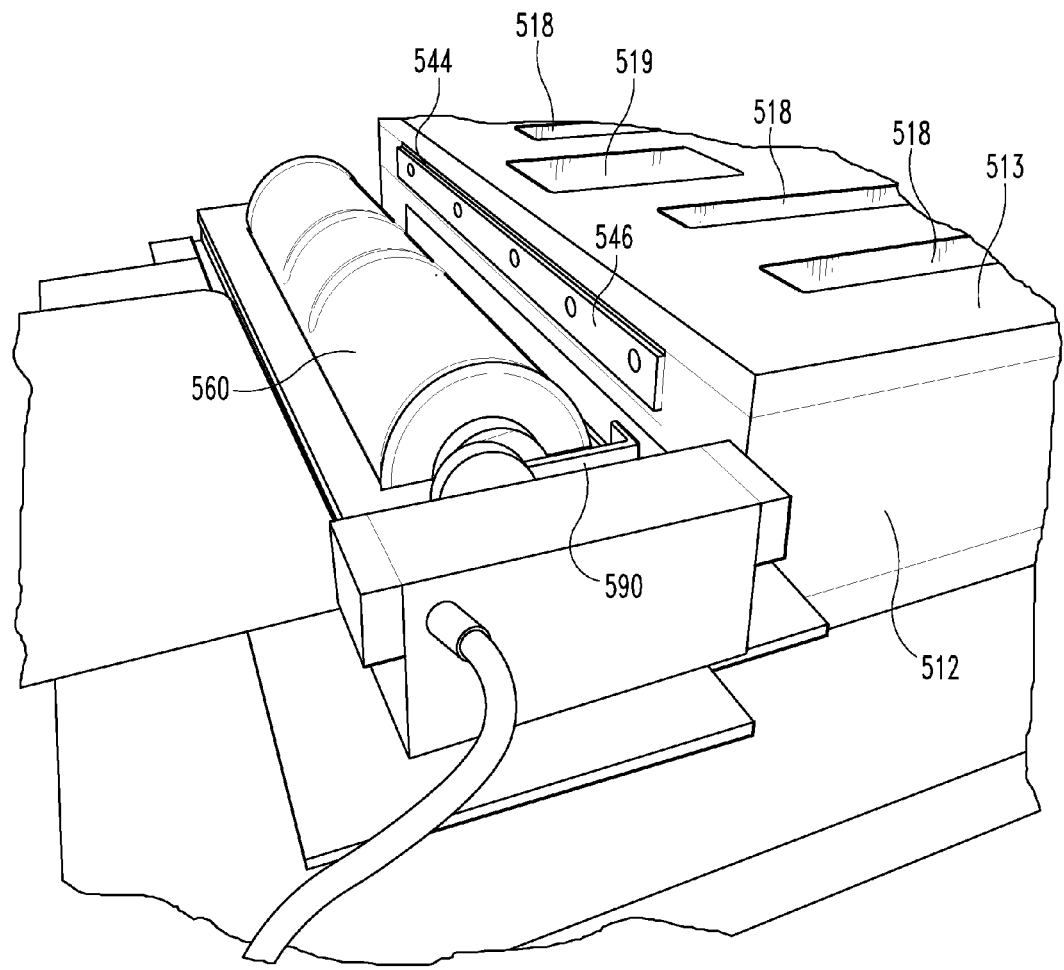

Progressive die arrangement 500 further includes a bending assembly 550 illustrated in detail in FIGS. 13-15. Bending assembly 550 is arranged adjacent the forward edge 544 of cutting assembly 510, to receive sheet metal 235 advanced through bed 512. Bending assembly 550 includes a lower die 560 and an upper die 580. Upper die 580 is mounted on upper carrying plate 520. Upper die 580 includes a cutting bar 584, preferably replaceable, which forms a shearing relationship with a lower cutting bar 546 along edge 544 to cut extending sheet metal material into blanks as the die arrangement compresses.

Lower die 560 includes a radiused male portion forming a radius and diameter corresponding to the desired inner arcuate radius and curve of the saddle to be formed. The radius may extend for approximately 180°, or optionally may include a slight variation or be slightly oversized to accommodate expected spring back of the metal material being bent. Optionally arranged on lower die 560 are partial or full ribs 564 to press corresponding partial or 180° ribs into the metal blank being bent. Lower die 560 optionally but preferably includes slightly tapered flared portions 567 at each end to impart a flare to the width edges of the blank 230 being bent. Optionally, lower die 560 can be arranged to accommodate blanks of length $L_1$ or $L_2$ as discussed with respect to other embodiments herein.

Preferably, the center of the male bending portion is spaced from forward edge 544 at a distance corresponding to half of the distance between the cutting tips of the cutting pieces 527 along trim axis T-T and forward edge 544.

Upper die 580 has an upper female radiused bending portion matching and complementary to the male bending portion of lower die 560. The female bending portion allows, for example with indentations or grooves, for partial or full ribs 564 to press ribs of lower die 560 into the metal being bent.

Figure 17:
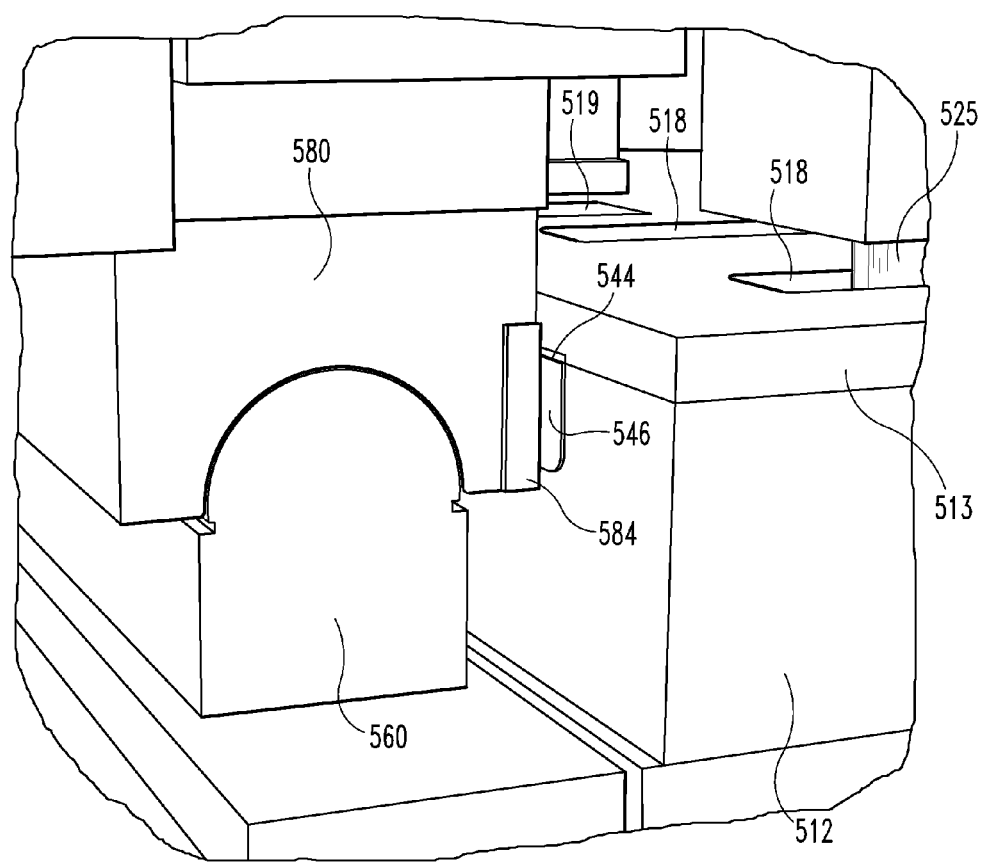
Figure 18:
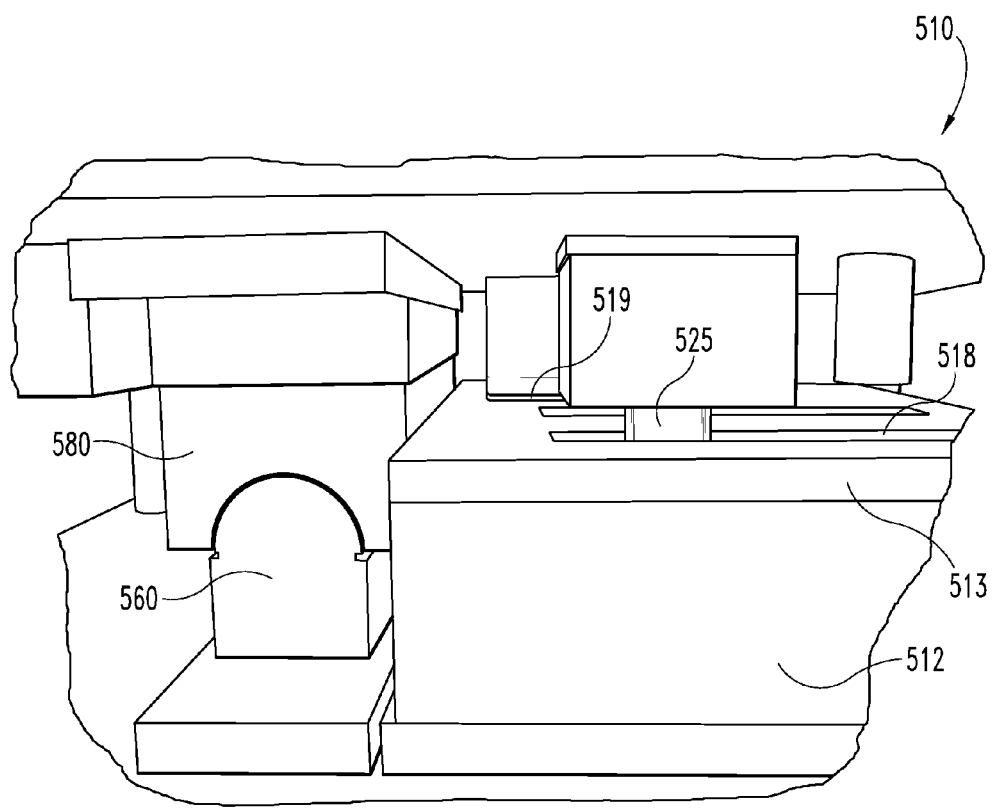

In operation of the illustrated progressive die, shown in FIGS. 16-18, a ribbon or strip of metal 235 is fed into bed 512 via entry slot 514. Prior to the introduction of the metal, cutting pieces 527 and cutting punches 525 are arranged at a distance from shearing edge 544 corresponding to the width of the desired blank 230 to be cut and then formed into the desired circumference measurement of the saddle being produced. Ejector assembly 590 is not illustrated in FIGS. 16-18 for ease of reference.

In a loading step, the leading edge of metal 235 is advanced into bed 512 until the forward edge is adjacent the shear edge of cutting bar 546. Optionally, the metal may be advanced further or less; however, a scrap portion will typically need to be cut and discarded in the first cycle or two of the die assembly to create a leading edge with two rounded corners.

In a first cycle of operation, trimming assembly 510 and bending assembly 550 compress concurrently to shear off any excess material extending beyond cutting bar 546 and also to punch radiused convex indentations as cut-out shapes 255 along axis T-T into the metal material. Upon completion of the first compression and release cycle, the metal strip is advanced a distance through the die. In the next position, illustrated in FIG. 16, the forward or leading portion of the metal 235 has rounded corners. Additionally, the next portion in which the radiused indentations 255 were made along an axis T-T is aligned with the forward edge 544 and cutting bar 546. The forward portion of the metal extends between lower die 560 and upper die 580.

Upon the next compression cycle, carrying plate 520 is lowered to simultaneously lower cutting pieces 525 and upper die 580. During the compression step, cutting bars 584 and 546 cut the metal material 235 along one axis T-T, leaving a separated blank 230 which is then bent between the upper and low dies 580 and 560. Simultaneously, cutting pieces 525 are punching the next radiused indentations 255 into the metal of material 235 along the next axis T-T. Each compression and cutting cycle by punches 525 forms two rounded corners 260 on one side of an axis T-T and two rounded corners 260 on the opposite side of the axis T-T. When the metal is advanced and then cut along that axis T-T, these form rounded trailing corners of a prior blank and rounded leading corners on the edge of the next blank.

As the die closes in the second and successive iterations as illustrated in FIGS. 17 and 18, the upper die 580 and the lower die 560 contact and hold the metal piece between them in a three point contact grasp. As the metal is cut and the dies continue to compress, the metal is bent around the male radius until the desired bend arc has been imparted to the blank.

Figure 19:
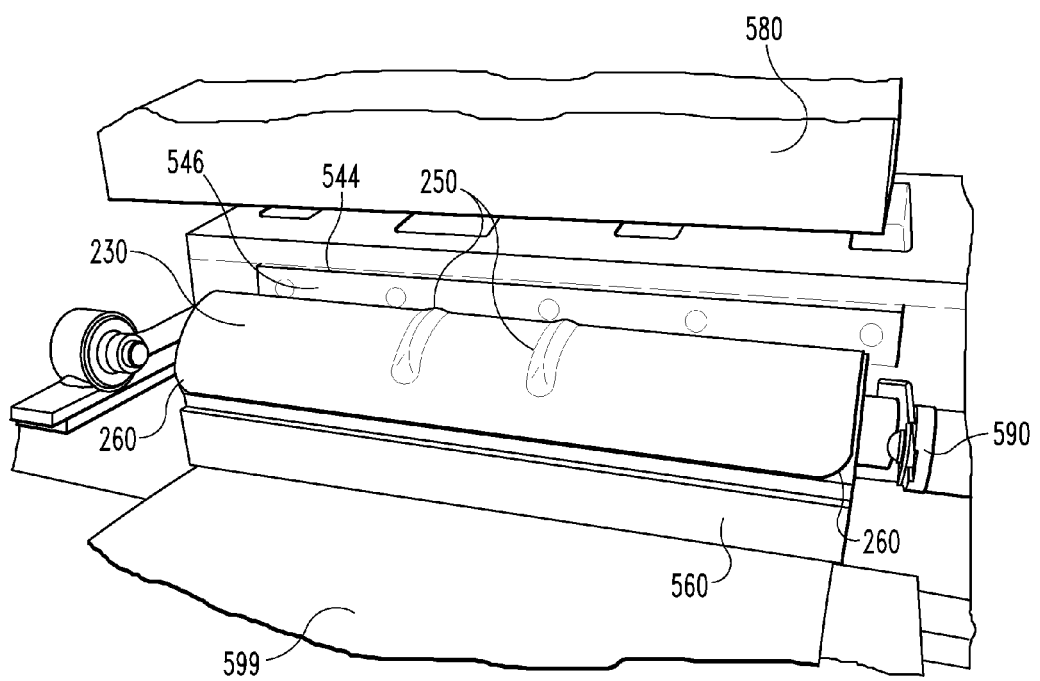
Figure 20:
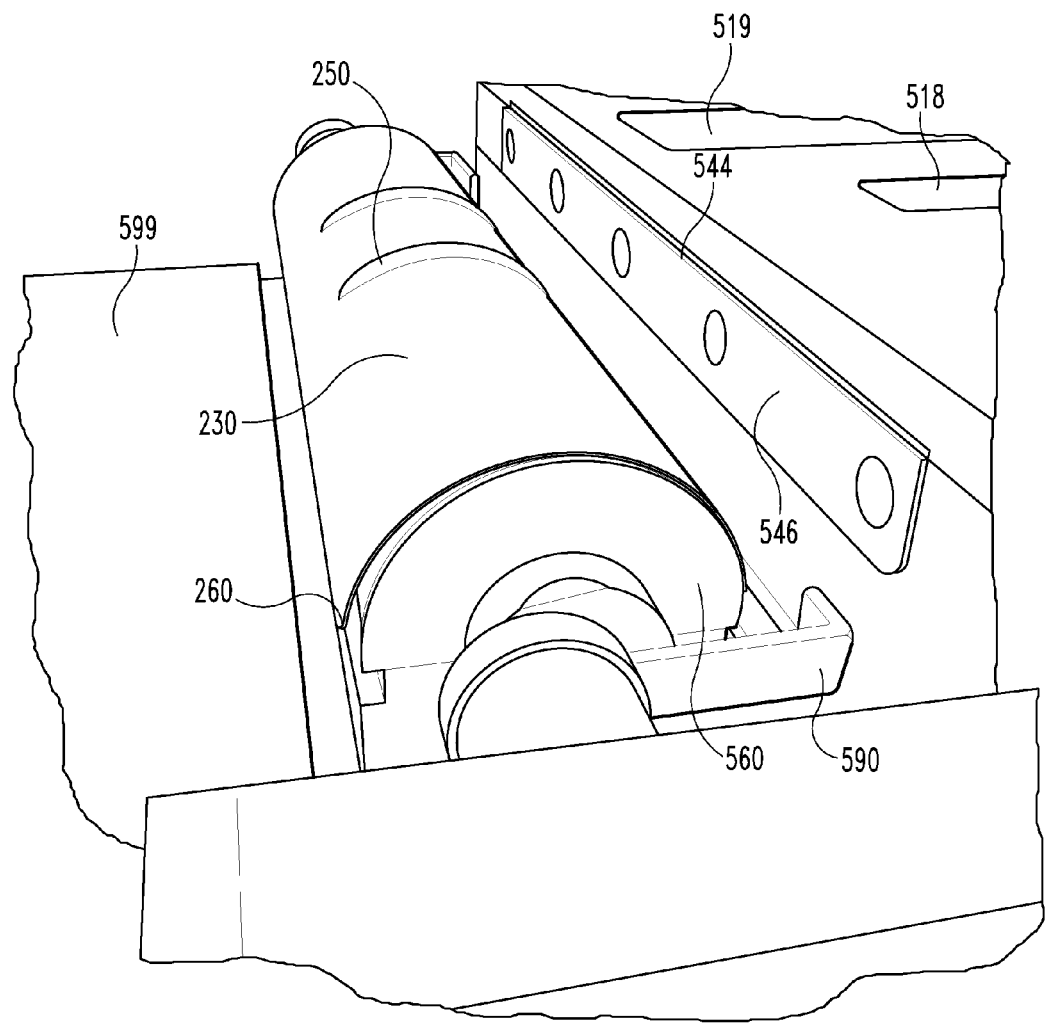
FIGS. 20-22 illustrate an ejector assembly useable in the embodiments of FIGS. 9-11.
Figure 21:
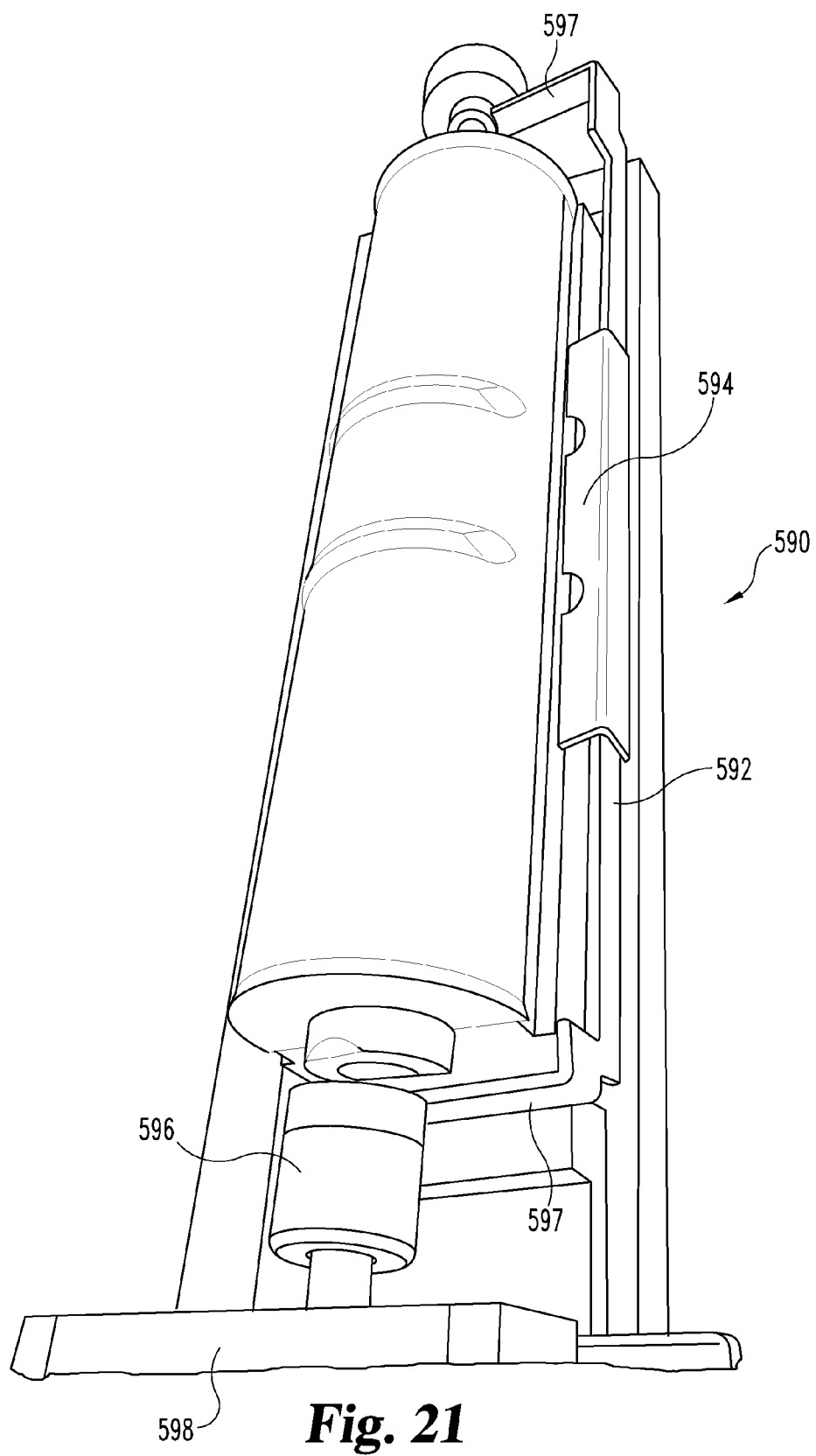
Figure 22:
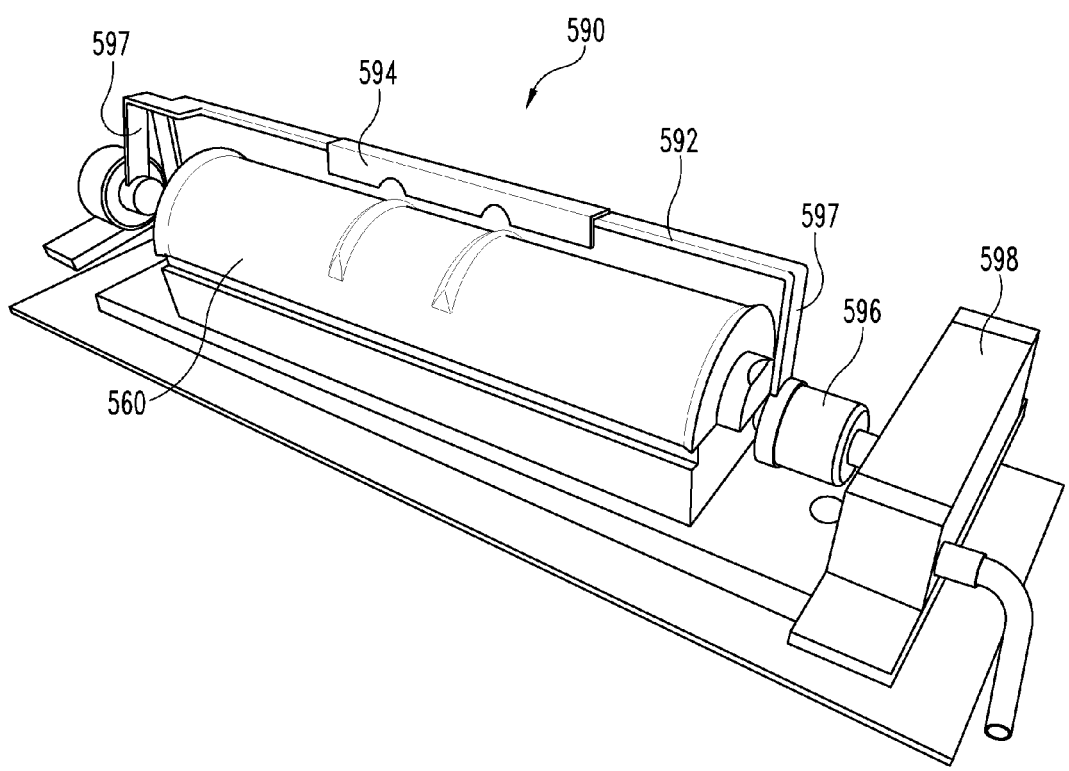
Figure 23:
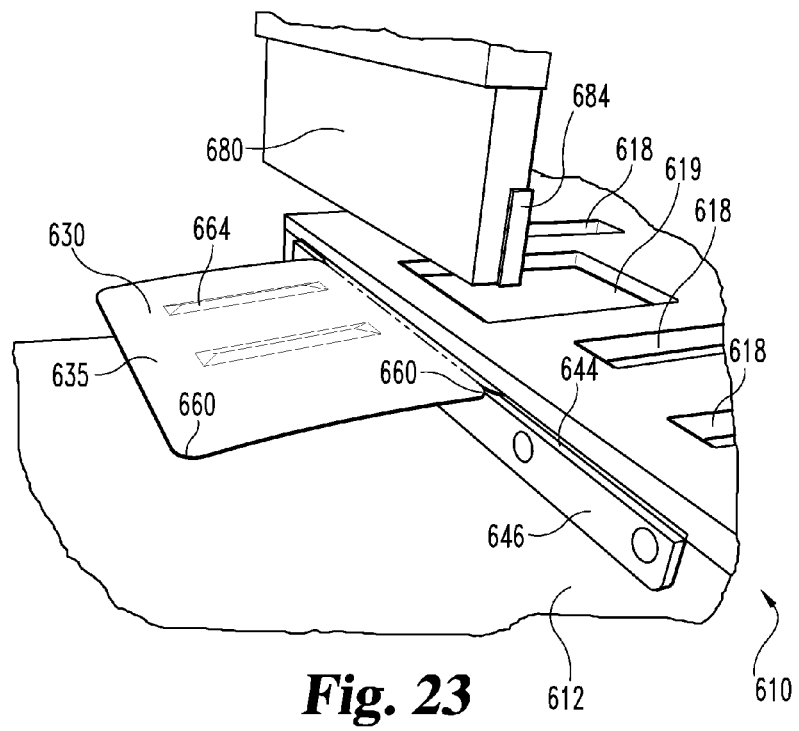
FIGS. 23A and 23B illustrate perspective views of a cutting assembly usable in certain embodiments.

Upon completion of a compression cycle, once the die portions are separated as seen in FIG. 19, the formed arcuate saddle 230 may be removed from lower die 560. The metal material is then advanced a distance to provide the next portion of material to be cut off and bent in bending assembly and the next portion of material to be cut with indentations 255 in the trimming assembly. The timing of compression cycles, removal of finished saddles and advancing material is preferably synchronized. The operation may be repeated as desired to form multiple arcuate saddles with rounded corners.

In certain preferred embodiments, an ejector mechanism such as ejector assembly 590 can be used to eject a formed arcuate saddle from lower die 560, for example onto a gravity slide 599 into a collection area. Details of an example ejector assembly 590 are illustrated in FIGS. 19-22 among others. In the illustrated embodiment, ejector assembly 590 includes a longitudinal arm 592 extending alongside and parallel to the base of lower die 560. In its lowered position, arm 592 lies between lower die 560 and bed 512. Preferably a scraper portion 594 is formed with or attached to arm 592, although alternately the arm can directly function as the scraper portion. Scraper portion is arranged along selected portions or entirely along the length of lower die 560 and extends closely adjacent the face of lower die 560.

Ejector assembly 590 includes two radial legs 597 having outer ends formed with or attached to opposing ends of arm 592 and inner ends aligned along a longitudinal axis defined by a pair of pivot points. At least one of the inner leg ends is mounted to an axle portion 596 as a crank arm at a fixed angular relationship which allows and causes the radial legs 597, arm 592 and scraper portion 594 to rotate around the pivot point and lower die 560 when the axle portion 596 is rotated. One end of ejector assembly 590 includes a rotation mechanism 598 operable to rotate axle portion 596 and thus ejector assembly 590 on demand. In one example embodiment, rotation mechanism 598 includes a compressed air powered cylinder which expands and contracts and correspondingly rotates a crank arm or gearing inside rotation mechanism 598 to correspondingly rotate the axle and ejector arm 592.

Preferably the closest separation distance between scraper portion 594 and the face of lower die 560 is less than the thickness of the sheet metal material being used. In one embodiment, when ejector assembly 590 is operated, scraper portion 594 impacts the lower edge of the finished saddle and propels the saddle off of the lower die and onto slide 599 directed to a collection point. The pivot axis may be aligned with the axis defined by the radius of die 560. Alternately, scraper portion 594 may contact the surface or other aspects of the finished saddle and may follow a path not corresponding to the radius of the lower die, such as a radial path eccentric to the die or following a tangential approach path. In certain embodiments, engagement features such as rubber feet or pads may be used to allow the ejector assembly to contact and propel the saddle while not wearing on the lower die.

In certain preferred embodiments, compressive die assembly 500 and other arrangements herein include appropriate sensors and PLCs to monitor material within the assembly before, during and after compression cycles. Such sensors may signal operational readiness states. Preferably sensors may be used to detect whether material is within bed 512 and whether material is present and ready to be bent between lower die 560 and upper die 580. Further a sensor and PLC preferably detects when an arcuate saddle has been formed and, upon sufficient separation of the dies, triggers the ejector assembly 590 to eject the finished saddle from lower die 560. Completion of a compression cycle and ejection of a finished saddle preferably further is synchronized with a signal to an automated feed mechanism to advance the metal material the next desired distance within arrangement 500 for the next cycle.

Figure 24:
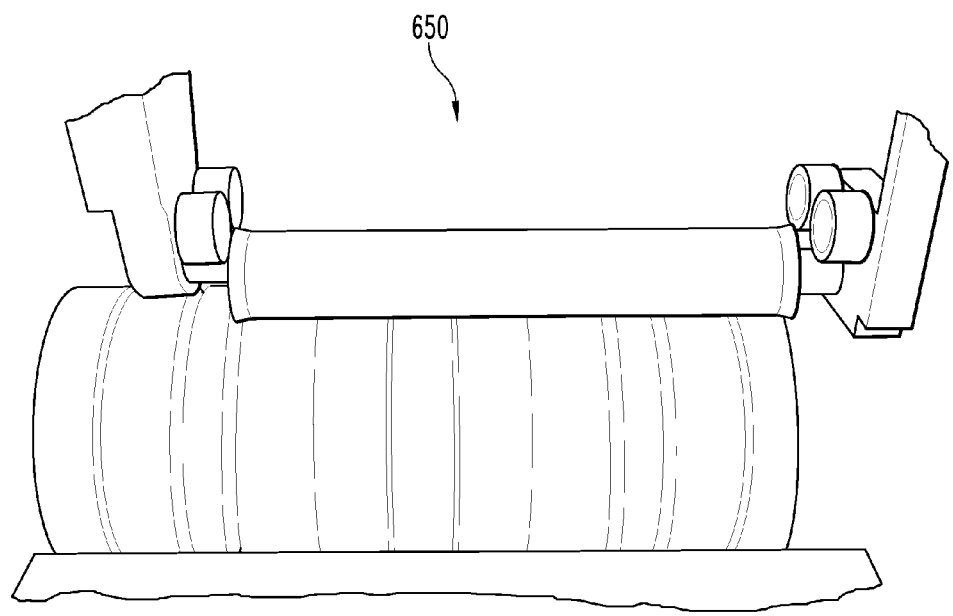
FIG. 24 is a perspective view of a roll bending arrangement usable in certain embodiments.
Figure 23A:
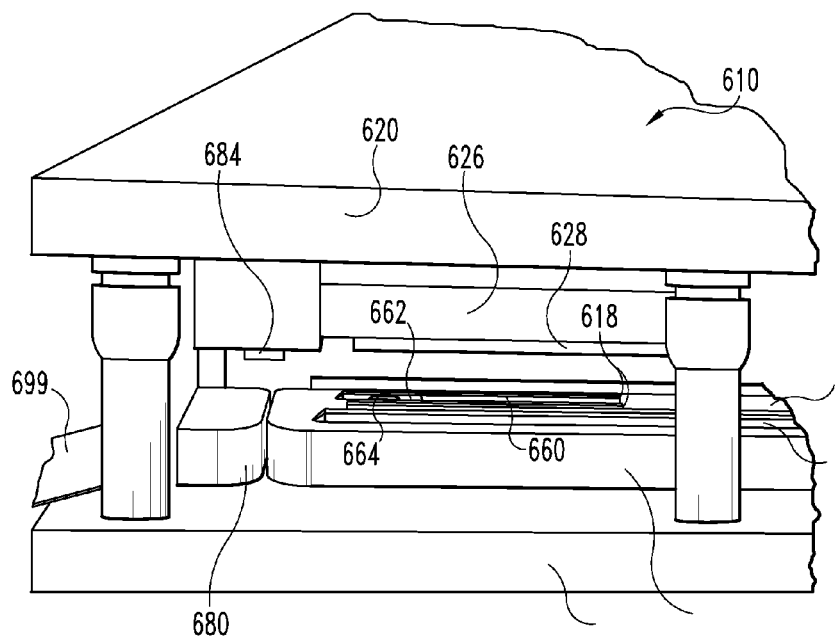
Figure 23B:
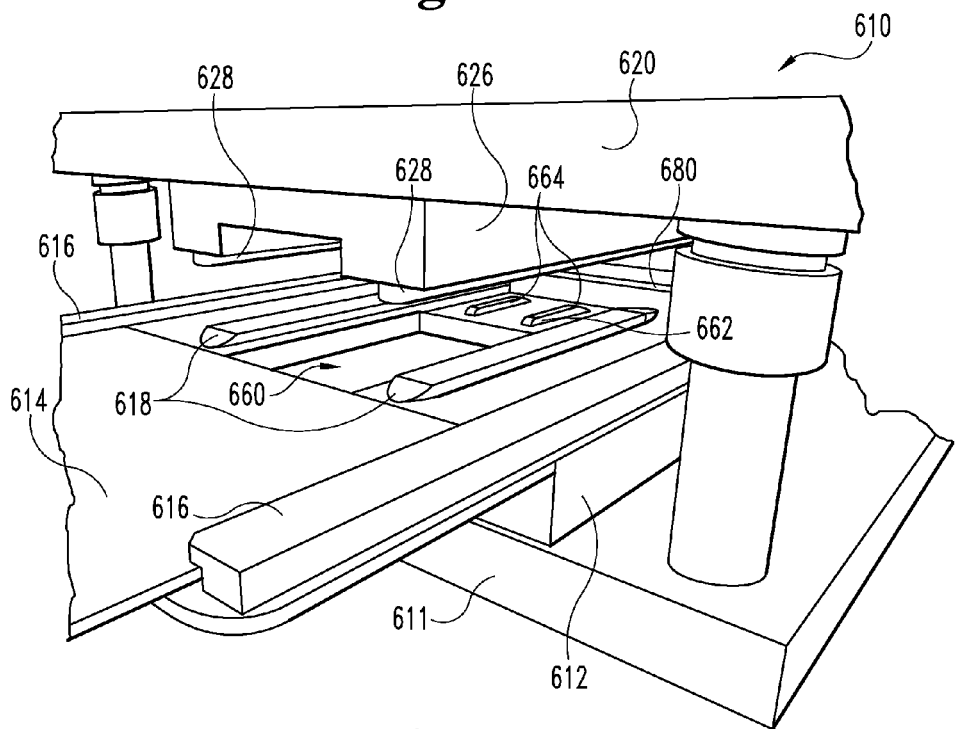

A further example embodiment of a manufacturing arrangement is illustrated in FIGS. 23A, 23B and 24. FIGS. 23A and 23B show a cutting assembly 610 and FIG. 24 shows a roll bending assembly 650.

Cutting assembly 610 includes a bed 612 carried on a base plate 611. A sheet metal path sized to receive sheet metal material is formed along bed entry 614 between side rails 616. Bed 612 further includes two slide rails 618 along the metal path, which slightly raise the metal material as it is fed into the assembly. Bed 612 further defines an inset or lowered area 660 between slide rails 618. A rib block 662 can be placed within inset area 660. In certain embodiments, rib block 662 includes upward protruding rib portions 664 along all or a portion of the block length. Rib block 662 preferably can be mounted at selected desired positions within inset area 660 to corresponded to desired placement of rib indentations in the metal material.

In the illustrated embodiment, the tops of slide rails 618 are slightly taller than the height of protruding rib portions 664 so that material travelling over the slide rails travels above protruding rib portions 664. In this arrangement, slide rails 618 are preferably mounted within slots in bed 612. Specifically, slide rails 618 are resiliently supported by springs within the bed to allow slide rails 618 to depress under pressure during the compression cycle and to be biased to rise upward when the pressure is released.

The forward portion of bed 612 defines a lower cutting profile 680. Lower cutting profile extends lengthwise across the width of bed 612, and preferably corresponds in length to the width of the metal material to be cut. Lower cutting profile 680 has two convex radiused portions at each end. The radiused portions extend inward from the edges to a longitudinal channel connecting the radiused portions at opposing ends of the profile. An exit slide 699 is arranged along the path forward of cutting profile 680.

The upper portion of assembly includes carrying plate 620 arranged in a compressive arrangement with bed 612. Carrying plate 620 includes a stamping portion 626 arranged opposite slide rails 618 and ribs 664. Stamping portions 626 includes clamping rails 628 arranged opposite sliding rails 618. An upper rib block is mounted between clamping rails 628 and aligned opposite lower rib block 662. The upper rib block defines rib portions complimentary to the rib portions in the lower rib block, such a grooves corresponding to and aligned with protruding rib portions 664.

The forward portion of carrying plate 620 includes an upper cutting or punch portion 684. Punch portion 684 is aligned with the placement and length of lower cutting profile 680 across the width of bed 612, and preferably corresponds in length to the width of the metal material to be cut. Punch portion 684 is complementary in size and shape to lower cutting profile 680, and defines two concave radiused portions at each end which are connected by a thin punch blade.

In operation, a coil or ribbon of metal material is fed into assembly 610 via entry 614. As the metal is advanced, it slides upward and over sliding rails 618 and thus travels above protruding ribs 664. In the loading cycle, the forward edge of the metal is advanced at least slightly forward of cutting profile 680. Carrying plate 620 is then compressed downward. During the downward compression, clamping rails 628 contact the metal material and depress it, correspondingly depressing sliding rails 618. Depression of sliding rails 618, allows the metal material to bear against the protruding rib portions 664 which then stamps the metal between the protruding rib portions 664 and the corresponding rib portions in the upper rib block to form rib indentations. Upon upward motion of carrying plate 620, sliding rails 618 rise, in turn raising the material above the protruding rib portions 664, enabling the material to travel forward without hindrance by the rib portions.

Concurrently, with stamping rib indentations into the material, punch portion 684 engages the metal against lower cutting profile 680 in a shearing arrangement which cuts a piece of material from the metal. The cut shape forms convex rounded corners on the trailing edge of the metal material forward of cutting profile 680 and forms convex rounded portions on the leading edge of the material rearward of cutting profile 680. Additionally, the blade of punch portion 684 cuts the material along the channel of profile 680, separating metal material forward of cutting profile 680 from the material rearward of cutting profile 680. The separated metal can then be removed from assembly 610, for example by being pushed to fall along slide 699.

After upward movement of carrying plate 620, the metal material is advanced forward a predetermined distance corresponding to the circumferential width of the saddle to be formed. This places the metal material containing the rib indentations stamped in the prior cycle forward of cutting profile 680. Upon the next compression cycle, cutting profile 680 and punch portion 684 forms convex rounded corners on the trailing edge of the metal material forward of cutting profile 680 and separate the material as a flat, ribbed blank of material with rounded corners. Currently, rib portions are stamped into the next portion of the metal material. The compression and advancement cycle can be repeated to create additional flat, ribbed saddle blanks.

In a separate step, using a manual or automated feed, the separated blank is fed into a roll bending assembly 650 which bends the blank into an arcuate shape. An example roll bending assembly 650 based on an Acrotech model 1618 machine, with a flared die, is illustrated in FIG. 24.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method of forming an arcuate saddle for supporting pipe, comprising:
    forming a first substantially rectangular flat metal saddle blank having a length and a width, wherein said saddle blank defines two parallel length sides and two parallel width sides wherein said blank defines corners wherein said length sides are substantially perpendicular to said width sides;
    cutting convex arcuate curves in the leading edge of said first saddle blank in a first cutting cycle using a pair of pierce punches;
    cutting rounded corner portions in the trailing edge of said first saddle blank and concurrently cutting rounded corner portions for the leading edge of a succeeding saddle blank in a second cutting cycle using said pierce punches in a second cutting cycle; and,
    forming said first substantially rectangular saddle blank into an arcuate saddle shape defined by a constant radius, wherein said arcuate saddle shape defines an interior channel having open ends sized to engage only the lower half of a supported pipe and concurrently cutting rounded corner portions in the trailing edge of said succeeding saddle blank in a third cutting cycle.

2. The method of claim 1 wherein said blank is formed into said arcuate shape using a roll bending process.

3. The method of claim 1 wherein said blank is formed into said arcuate shape using a stamping process.

4. The method of claim 1 wherein said removing material from said corners comprises cutting convex arcuate curves into said corners to form said rounded corners.

5. The method of claim 1, comprising:
    defining a trim axis between rounded corner portions for the trailing edge of said blank and the rounded corner portions for the leading edge of the succeeding blank;
    advancing said material to align said trim axis with a shearing edge; and,
    cutting said material along said trim axis to separate said blank from the material.

6. The method of claim 5, comprising roll bending said blank into an arcuate shape.

7. The method of claim 5, comprising stamping said blank into an arcuate shape in a stamping assembly.

8. The method of claim 7, comprising ejecting said arcuate shape from said stamping assembly in synchronized timing with advancing said material to align a succeeding trim axis with the shearing edge.

9. The method of claim 1, wherein said radius is sized to fit between a hanger and a pipe.

10. The method of claim 1, wherein said saddle blank is sized to be received between a pipe and a hanger encircling a pipe or insulated pipe.

11. The method of claim 1, wherein said forming said blank into an arcuate saddle shape defined by a constant radius includes forming the width of said blank into an arcuate shape having an arcuate profile of 180 degrees or less.

12. The method of claim 11, wherein said arcuate profile is approximately 180 degrees.

13. A method of forming an arcuate saddle for supporting pipe, comprising:
    automatically feeding a sheet of metal material from which a plurality of rectangular saddle blanks are to be cut;
    cutting rounded corner portions for the trailing edge of a saddle blank and concurrently cutting rounded corner portions for the leading edge of a succeeding saddle blank using a pair of pierce punches, each having two opposing concave portions extending from each side of the cutting piece inward along an arc toward the center of the material to form a tip;
    separating a substantially rectangular saddle blank with convex rounded corners defined by said rounded corner portions from said material, wherein said saddle blank defines two parallel length sides and two parallel width sides; and,
    forming said saddle blank into an arcuate saddle shape defined by a constant radius, wherein said arcuate saddle shape defines an interior channel having open ends sized to engage only the lower half of a supported pipe and concurrently cutting rounded corner portions in the trailing edge of said succeeding saddle blank.

14. The method of claim 13, wherein said cutting rounded corner portions comprises cutting rounded corner portion for the leading edge of said blank in a first cutting cycle and cutting rounded corner portions for the trailing edge of said blank in a second cutting cycle.

15. The method of claim 13, comprising defining a trim axis between rounded corner portions for the trailing edge of said blank and the rounded corner portions for the leading edge of the succeeding blank;
    advancing said material to align said trim axis with a shearing edge; and,
    cutting said material along said trim axis to separate said blank from the material.

16. The method of claim 15, comprising roll bending said blank into said arcuate shape.

17. The method of claim 15, comprising stamping said blank into said arcuate shape in a stamping assembly.

18. The method of claim 17, comprising ejecting said arcuate shape from said stamping assembly in synchronized timing with advancing said material to align a succeeding trim axis with the shearing edge.

19. The method of claim 13, comprising sizing the arcuate saddle shape to be received between a pipe and a hanger encircling a pipe or insulated pipe.

20. The method of claim 13, wherein said forming said blank into an arcuate saddle shape defined by a constant radius includes forming the width of said blank into an arcuate shape having an arcuate profile of 180 degrees or less.

21. The method of claim 20, wherein said arcuate profile is approximately 180 degrees.

* * * * *